United States Patent
Han et al.

(10) Patent No.: US 11,270,048 B2
(45) Date of Patent: Mar. 8, 2022

(54) CALIBRATION AND SIMULATION OF A WELLBORE LINER

(71) Applicant: Saudi Arabian Oil Company, Dhahran (SA)

(72) Inventors: Yanhui Han, Houston, TX (US); Younane N. Abousleiman, Norman, OK (US); Khalid Mohammed M. Alruwaili, Dammam (SA)

(73) Assignee: Saudi Arabian Oil Company, Dhahran (SA)

( * ) Notice: Subject to any disclaimer, the term of this patent is extended or adjusted under 35 U.S.C. 154(b) by 132 days.

(21) Appl. No.: 16/913,957

(22) Filed: Jun. 26, 2020

(65) Prior Publication Data
US 2021/0406426 A1 Dec. 30, 2021

(51) Int. Cl.
| | |
|---|---|
| G06F 30/23 | (2020.01) |
| E21B 41/00 | (2006.01) |
| G06F 30/10 | (2020.01) |
| G06F 119/14 | (2020.01) |
| E21B 17/00 | (2006.01) |
| G06F 111/10 | (2020.01) |

(52) U.S. Cl.
CPC .......... G06F 30/23 (2020.01); E21B 41/00 (2013.01); G06F 30/10 (2020.01); E21B 17/00 (2013.01); E21B 2200/20 (2020.05); G06F 2111/10 (2020.01); G06F 2119/14 (2020.01)

(58) Field of Classification Search
CPC ...... G06F 30/23; G06F 30/10; G06F 2119/14; G06F 2111/10; E21B 41/00; E21B 2200/20; E21B 17/00

USPC ............................................................ 703/2
See application file for complete search history.

(56) References Cited

U.S. PATENT DOCUMENTS

| | | | |
|---|---|---|---|
| 4,220,550 A | 9/1980 | Frenier et al. | |
| 4,289,639 A | 9/1981 | Buske | |
| 4,381,950 A | 5/1983 | Lawson | |

(Continued)

FOREIGN PATENT DOCUMENTS

| | | |
|---|---|---|
| WO | WO 2014116305 | 7/2014 |
| WO | WO 2016094153 | 6/2016 |
| WO | WO 2017078674 | 5/2017 |

OTHER PUBLICATIONS

Hadi Tranggono ("Wellbore Collapse Failure Criteria and Drilling Optimization", University of Stavanger, 2019, pp. 1-132) (Year: 2019).*

(Continued)

*Primary Examiner* — Iftekhar A Khan
(74) *Attorney, Agent, or Firm* — Fish & Richardson P.C.

(57) ABSTRACT

Methods for predicting a structural response and failure of a liner for a well can include receiving geometric properties of the liner; receiving structural properties of the liner; receiving material properties of the liner; developing a numerical model of the liner; calibrating one or more parameters of the constitutive model representing the material of the liner, the calibrating including: determining a numerical burst pressure failure; determining a numerical collapse failure pressure; and simulating the structural response and failure of the numerical model subjected to an expected non-uniform pressure loading of the well, where the numerical model is used to predict the structural response and failure of the liner when installed in the well.

20 Claims, 21 Drawing Sheets

(56) References Cited

U.S. PATENT DOCUMENTS

| | | | |
|---|---|---|---|
| 5,999,887 A | 12/1999 | Giannakopoulos et al. | |
| 6,283,214 B1* | 9/2001 | Guinot | E21B 43/117 |
| | | | 102/313 |
| 6,516,080 B1* | 2/2003 | Nur | G06T 7/40 |
| | | | 348/85 |
| 6,866,048 B2 | 3/2005 | Mattox | |
| 7,188,058 B2* | 3/2007 | Hardy | E21B 47/007 |
| | | | 703/10 |
| 7,369,980 B2* | 5/2008 | Deffenbaugh | G01V 1/301 |
| | | | 703/10 |
| 8,380,437 B2 | 2/2013 | Abousleiman et al. | |
| 8,868,385 B2* | 10/2014 | Fertig | G06F 30/23 |
| | | | 703/2 |
| 9,739,905 B2* | 8/2017 | Sena | G01V 3/28 |
| 9,822,639 B2* | 11/2017 | Jandhyala | C09K 8/42 |
| 2003/0171879 A1* | 9/2003 | Pittalwala | F17D 5/00 |
| | | | 702/34 |
| 2003/0173081 A1* | 9/2003 | Vinegar | E21B 43/243 |
| | | | 166/272.1 |
| 2003/0173082 A1* | 9/2003 | Vinegar | E21B 43/243 |
| | | | 166/272.2 |
| 2003/0192693 A1* | 10/2003 | Wellington | E21B 41/0064 |
| | | | 166/267 |
| 2004/0020642 A1* | 2/2004 | Vinegar | B09C 1/02 |
| | | | 166/245 |
| 2005/0060130 A1 | 3/2005 | Shapiro et al. | |
| 2007/0203677 A1* | 8/2007 | Awwiller | G01V 11/00 |
| | | | 703/1 |
| 2009/0193881 A1 | 8/2009 | Finnberg | |
| 2010/0128982 A1 | 5/2010 | Dvorkin et al. | |
| 2010/0186520 A1 | 7/2010 | Wheeler | |
| 2010/0213579 A1 | 8/2010 | Henry | |
| 2010/0279136 A1 | 11/2010 | Bonucci | |
| 2013/0336612 A1* | 12/2013 | Pearce | E21B 47/017 |
| | | | 385/12 |
| 2014/0039797 A1* | 2/2014 | Gonzales | G01V 99/005 |
| | | | 702/11 |
| 2014/0048694 A1 | 2/2014 | Pomerantz | |
| 2014/0214326 A1* | 7/2014 | Samuel | E21B 47/00 |
| | | | 702/11 |
| 2015/0198038 A1* | 7/2015 | Bartetzko | E21B 41/02 |
| | | | 166/250.05 |
| 2015/0293256 A1 | 10/2015 | Dusterhoft | |
| 2016/0203239 A1* | 7/2016 | Samuel | E21B 43/10 |
| | | | 703/1 |
| 2017/0067836 A1 | 3/2017 | Hull et al. | |
| 2017/0260848 A1* | 9/2017 | Xia | E21B 47/135 |
| 2018/0087350 A1* | 3/2018 | Sherman | E21B 43/086 |
| 2018/0094519 A1* | 4/2018 | Stephens | E21B 33/0355 |
| 2018/0179881 A1* | 6/2018 | Thompson | E21B 43/24 |
| 2018/0196005 A1* | 7/2018 | Fanini | G01N 27/82 |
| 2018/0274312 A1* | 9/2018 | Zhou | E21B 43/08 |
| 2018/0371882 A1* | 12/2018 | Delange | E21B 43/108 |
| 2019/0112912 A1* | 4/2019 | Thompson | E21B 47/007 |
| 2019/0257179 A1* | 8/2019 | Assaad | E21B 43/105 |
| 2019/0257187 A1* | 8/2019 | Aljubran | E21B 47/26 |
| 2019/0257729 A1* | 8/2019 | Han | B23K 26/38 |
| 2020/0011169 A1* | 1/2020 | Haghshenas | E21B 47/00 |
| 2020/0095855 A1* | 3/2020 | Hughes | E21B 34/142 |
| 2020/0378246 A1* | 12/2020 | Rodriguez Herrera | |
| | | | G01V 99/00 |
| 2021/0332686 A1* | 10/2021 | Safariforoshani | E21B 43/255 |
| 2021/0406426 A1* | 12/2021 | Han | E21B 41/00 |

OTHER PUBLICATIONS

Huang et al. ("A theoretical study of the critical external pressure for casing collapse", SPE, Journal of Natural Gas Science and Engineering, 2015, pp. 290-297) (Year: 2015).*

Dall'Acqua et al., "Burst and collapse responses of production casing in thermal applications." SPE Drilling & Completion 28.01, Mar. 2013, 93-104, 12 pages.

PCT International Search Report and Written Opinion in International Appln. No. PCT/US2021/038964, dated Sep. 14, 2021, 14 pages.

Abad et al., "Evaluation of the Material Properties of the Multilayered Oxides formed on HCM12A using New and Novel Techniques," Manuscript Draft, 2015, Manuscript No. OXID-D-15-00019, 44 pages.

Abousleiman et al, "A Micromechanically Consistent Poroviscoelasticity Theory for Rock Mechanics Applications," Int. J. Rock Mech. Min. Sci. & Geomech. Abstr., 1993, 30(7), 4 pages.

Abousleiman et al, "Anisotropic Porothermoelastic Solution and Hydro-Thermal Effects on Fracture Width in Hydraulic Fracturing," Int. J. Numer. Anal. Meth. Geomech., 2013, 25 pages.

Abousleiman et al, "Poroviscoelastic Analysis of Borehole and Cylinder Problems," ACTA Mechanica, 1996, 119, 21 pages.

Abousleiman et al, "SPE 110120: Geomechanics Field and Laboratory Characterization of Woodford Shale: The Next Gas Play," SPE International, SPE 110120, presented at the 2007 SPE Annual Technical Conference and Exhibition on Nov. 11-14, 2007, 14 pages.

Abousleiman et al., "GeoGenome Industry Consortium (G2IC)," JIP, 2004-2006, 6 pages.

Abousleiman et al., "Geomechanics Field Characterization of the Two Prolific U.S. Mid-West Gas Plays with Advanced Wire-Line Logging Tools," SPE International, SPE 124428, presented at 2009 SPE Annual Technical Conference and Exhibition, Oct. 2009, 19 pages.

Abousleiman et al., "Mandel's Problem Revisited," Geotechnique, 1996, 46(2), 9 pages.

Abousleiman et al., "Mechanical Characterization of Small Shale Samples subjected to Fluid Exposure using the Inclined Direct Shear Testing Device," Int. J. Rock Mech. & Min. Sci., 2010, 47(3), 13 pages.

Abousleiman et al., "Poroelastic Solutions in Transversely Isotropic Media for Wellbore and Cylinder," Int. J. Solids Structures, 1998, 35:34-35, 25 pages.

Abousleiman et al., "The Granular and Polymer Nature of Kerogen Rich Shale," Acta Geotech, Feb. 2016, 11, 24 pages.

Allan et al., "A Multiscale Methodology for the Analysis of Velocity Anisotropy in Organic-Rich Shale," Geophysics, Jul.-Aug. 2015, 80(4), 16 pages.

Al-Yami et al., "Engineered Fit-for-Purpose Cement System to Withstand Life-of-the-Well Pressure and Temperature Cycling," In Abu Dhabi International Petroleum Exhibition & Conference. Society of Petroleum Engineers, SPE-188488-MS, Nov. 2017, 14 pages.

Ananthan et al., "Influence of Strain Softening on the Fracture of Plain Concrete Beams," Int. J. of Fracture, 1990, 45, 25 pages.

Arns et al., "Computation of linear elastic properties from microtomographic images: Methodology and agreement between theory and experiment", Geophysics, Sep. 2002, 67(5):1396-1405, 10 pages.

Ballice, "Solvent Swelling Studies of Goynuk (Kerogen Type-I) and Beypazari Oil Shales (Kerogen Type-II)," Science Direct, Fuel, 2003, 82, 5 pages.

Bazant et al., "Deformation of Progressively Cracking Reinforced Concrete Beams," ACI Journal, Technical Paper, Title No. 81-26, May-Jun. 1984, 81(3), 11 pages.

Bazant et al., "Strain-Softening Bar and Beam: Exact Non-Local Solution," Int. J. Solids Structures, 1988, 24(7), 15 pages.

Bennett et al., "Instrumented Nanoindentation and 3D Mechanistic Modeling of a Shale at Multiple Scales," Acta Geotechnica, Jan. 2015, 10(21), 14 pages.

Berger et al., "Effect of eccentricity, voids, cement channels, and pore pressure decline on collapse resistance of casing," SPE-90045-MS, In SPE Annual Technical Conference and Exhibition. Society of Petroleum Engineers, Jan. 2004, 8 pages.

Bhandari et al., "Two-Dimensional DEM Analysis of Behavior of Geogrid-Reinforced Uniform Granular Bases under a Vertical Cyclic Load, Acta Geotechnica," 2014, 12 pages.

Biot, "General Theory of Three-Dimensional Consolidation," Journal of Applied Physics, Feb. 1941, 12(2), 11 pages.

Bobko et al., "The Nanogranular Origin of Friction and Cohesion in Shale—A Strength Homogenization Approach to Interpretation of

(56) References Cited

OTHER PUBLICATIONS

Nanoindentation Results," International Journal for Numerical Analytical Method in Geomechanics, 2010, 23 pages.
Boskey et al., "Perspective—Collagen and Bone Strength," Journal of Bone and Mineral Research, 1999, 14(3), 6 pages.
Chen et al., "Size Effect in Micro-Scale Cantilever Beam Bending," Acta Mech., 2011, 17 pages.
Chern et al., "Deformation of Progressively Cracking Partially Prestressed Concrete Beams," PCI Journal, 1992, 37(1), 11 pages.
Chupin et al., "Finite Strain Analysis of Nonuniform Deformation Inside Shear Bands in Sands," Int. J. Numer. Anal. Meth. Geomech., 2012, 16 pages.
Deirieh et al., "Nanochemomechanical Assessment of Shale: A Coupled WDS-Indentation Analysis," Acta Geotechnica, 2012, 25 pages.
Devarapalli et al., "Micro-CT and FIB-SEM imaging and pour structure characterization of dolomite rock at multiple scales," Arabian Journal of Geosciences, Aug. 2017, 9 pages.
Ekbote et al., "Porochemoelastic Solution for an Inclided Borehole in a Transversely Isotropic Formation," Journal of Engineering Mechanics, ASCE, Jul. 2006, 10 pages.
Ertas et al., "Petroleum Expulsion Part 1. Theory of Kerogen Swelling in Multicomponent Solvents," Energy & Fuels, 2006, 6 pages.
Ewy, "Shale Swelling/Shrinkage and Water Content Change due to Imposed Suction and Due to Direct Brine Contact," Acta Geotechnica, 2014, 18 pages.
Frazer et al., "Localized Mechanical Property Assessment of SiC/ SiC Composite Materials," Science Direct, 2015, Part A 70, 9 pages.
Gao et al., "Materials Become Insensitive to Flaws at Nanoscale: Lessons from Nature," PNAS, May 2003, 100(10), 628 pages.
Garnero, "The Contribution of Collagen Crosslinks to Bone Strength," Int. Bone & Mineral Society, Sep. 2012, 8 pages.
Georgi et al., "Physics and Chemistry in Nanoscale Rocks", Mar. 22-26, 2015, La Jolla, California, USA, SPE Forum Series, 4 pages.
Goodman, "Introduction to Rock Mechanics," John Wiley & Sons, Chapter 3: Rock Strength and Failure Criteria, 21 pages.
Han et al., "Impact of Depletion on Integrity of Sand Screen in Depleted Unconsolidated Sandstone Formation," ARMA-2015-301, In 49th US Rock Mechanics/Geomechanics Symposium. American Rock Mechanics Association, 2015, 9 pages.
Han et al., "LBM-DEM Modeling of Fluid-Solid Interaction in Porous Media," Int. J. Numer. Anal. Meth. Geomech., 2013, 17 pages.
Han et al., "Numerical Modeling of Elastic Hemispherical Contact for Mohr-Coulomb Type Failures in Micro-Geomaterials," Experimental Mechanics, Jun. 2017, 57, 14 pages.
Hoang et al., "Correspondence Principle Between Anisotropic Poroviscoelasticity and Poroelasticity using Micromechanics and Application to Compression of Orthotropic Rectangular Strips," Journal of Applied Physics, American Institute of Physics, Aug. 2012, 112, 16 pages.
Hornby et al., "Anisotropic Effective-Medium Modeling of the Elastic Properties of Shales," Geophysics, Oct. 1994, 59(10), 14 pages.
Hosemann et al, "Mechanical Characteristics of SiC Coating Layer in TRISO Fuel Particles," Journal of Nuclear Materials, 2013, 442, 10 pages.
Hosemann et al., "An Exploratory Study to Determine Applicability of Nano-Hardness and Micro-compression Measurements for Yield Stress Estimation," Science Direct, 2008, 9 pages.
Huang et al., "A theoretical study of the critical external pressure for casing collapse" Journal of Natural Gas Science and Engineering, Nov. 2015, 27(1), 8 pages.
Huang et al., "Collapse strength analysis of casing design using finite element method," International Journal of Pressure Vessels and Piping 2000, 77:359-367, 8 pages.
Iqbal et al., "In situ micro-cantilver tests to study fracture properties of NiAl single crystals," Acta Materialia, Feb. 2012, 60(3), 8 pages.
Itasca "Three-dimensional Fast Lagrangian Analysis of Continua (FLAC3D)," available on or before 2012, [retrieved on Jun. 7, 2018], retrieved from URL: <https://www.itascacg.com/software/flac3d>, 4 pages.
Itasca, 2011. Fast Lagrangian Analysis of Continua, Version 7.0. Minneapolis, Minnesota, 22 pages.
Iyengar et al., "Analysis of Crack Propagation in Strain-Softening Beams," Engineering Fracture Mechanics, 2002, 18 pages.
Jose et al., "Continuous multi cycle nanoindentation studies on compositionally graded $Ti_{1-x}Al_xN$ multilayer thin films," (XP028230250) Materials Science and Engineering: A, Elsevier, Apr. 20, 2011, 528(21), 7 pages.
Kelemen et al., "Petroleum Expulsion Part 2. Organic Matter Type and Maturity Effects on Kerogen Swelling by Solvents and Thermodynamic Parameters for Kerogen from Regular Solution Theory," Energy & Fuels, 2006, 8 pages.
Kolymbas, "Kinematics of Shear Bands," Acta Geotechnica, 2009, 4 pages.
Lam et al., "Experiments and Theory in Strain Gradient Elasticity," J. Mech. And Phys. Of Solids, 2003, 32 pages.
Larsen et al., "Changes in the Cross-Link Density of Paris Basin Toarcian Kerogen During Maturation," Organic Geochemistry, 2002, 10 pages.
Lee et al., "An Analytical Study on Casing Design for Stabilization of Geothermal Well," Korean J. Air-Conditioning and Ref. Eng., 2012, 11(24(11)), 16 pages.
Li et al., "Mechanical Characterization of Micro/Nanoscale Structures for MEMS/NEMS Applications using Nanoindentation Techniques," Science Direct, 2003, 14 pages.
Liu, "Dimension effect on mechanical behavior of silicon micro— cantilver beams," Measurement, Oct. 2008, 41(8), 11 pages.
Liu, "Micro—cantilver Testing to Evaluate the Mechanical Properties of Thermal Barrier Coatings," 19th European Conference on Fracture (ECF19): Fracture Mechanics for Durability, Reliability and Safety; Conference Proceedings held Aug. 26-31, 2012, Kazan, Russia, 7 pages.
Mahabadi et al., "A novel approach for micro-scale characterization and modeling of geomaterials incorporating actual material heterogeneity," (XP002689941) Geophysical Research Letters, American Geophysical Union, Jan. 1, 2012 39(1), L01303, 6 pages.
Mahabadi et al., "Development of a new fully-parallel finite-discrete element code: Irazu," ARMA-2016-516, In 50th US Rock Mechanics/Geomechanics Symposium. American Rock Mechanics Association, Jun. 26-29, 2016, 9 pages.
Mahmoud et al., "Removal of Pyrite and Different Types of Iron Sulfide Scales in Oil and Gas Wells without H2S Generation," (IPTC-18279-MS) Presented at the International Petroleum Technology Conference (IPTC), Doha, Qatar, Dec. 6-9, 2015, 8 pages.
Maio et al., "Measuring Fracture Toughness of Coatings using Focused-ion-beam-machined Microbeams," 2004, 4 pages.
Mitchell et al., "Chapter 7—Casing and Tubing Design," Properties of Casing and Tubing, Petroleum well construction, 1998, 40 pages.
Mohammed et al., "Casing structural integrity and failure modes in a range of well types—A review," Journal of natural Gas Science and Engineering, 2019, 68, 25 pages.
Oliver, "An Improved Technique for Determining Hardness and Elastic Modulus using Load and Displacement Sensing Indentation Experiments," 1992, 20 pages.
Ortega et al., "The Effect of Particle Shape and Grain-Scale Properties of Shale: A Micromechanics Approach," Int. J. Numer. Anal. Methd. Geomech., 2010, 33 pages.
Ortega et al., "The Effect of the Nanogranular Nature of Shale on their Poroelastic Behavior," Acta Geotechnica, 2007, 28 pages.
Ortega et al., "The Nanogranular Acoustic Signature of Shale," Geophysics, May-Jun. 2009, 74(3), 20 pages.
Passey et al., "From Oil-Prone Source Rock to Gas-Producing Shale Reservoir—Geologic and Petrophysical Characterization of Unconventional Shale-Gas Reservoirs," Society of Petroleum Engineers International, CPS/SPE International Oil & Gas Conference and Exhibition, Beijing, China, Jun. 8-10, 2010, 29 pages.
Podio et al., "Dynamic Properties of Dry and Water-Saturated Green River Shale under Stress," Jun. 1968, SPE 1825, 16 pages.

(56) References Cited

OTHER PUBLICATIONS

Poon et al., "An Analysis of Nanoindentation in Linearly Elastic Solids," International Journal of Solids and Structures, Dec. 2008, 45(24), 16 pages.

Richard et al, "Slow Relaxation and Compaction of Granular Systems," Nature Materials, Feb. 2005, 4, 8 pages.

Shin et al., "Development and Testing of Microcompression for Post Irradiation Characterization of ODS Steels," J. Nuclear Materials, 2014, 6 pages.

Sierra et al., "Woodford Shale Mechanical Properties and the Impacts of Lithofacies," ARMA 10-461, 2010, 10 pages.

Slatt et al., "Merging Sequence Stratigraphy and Geomechanics for Unconventional Gas Shales," The Leading Edge, Mar. 2011, 8 pages.

Slatt et al., "Outcrop/Behind Outcrop (Quarry), Multiscale Characterization of the Woodford Gas Shale," 2011, 22 pages.

Sone et al., "Mechanical Properties of Shale-Gas Reservoir Rocks—Part 1: Static and Dynamic Elastic Properties and Anisotropy," Geophysics, Sep.-Oct. 2013, 78(5), 12 pages.

Sone et al., "Mechanical properties of shale-gas reservoir rocks—Part 2: Ductile creep, brittle strength, and their relation to the elastic modulus," Geophysics, 2013, 78(5), 10 pages.

Ulm et al., "Material Invariant Poromechanics Properties of Shales," 2005, 8 pages.

Ulm et al., "The Nanogranular Nature of Shale," Acta Geotechnica, 2006, 12 pages.

Vanlandingham, "Review of Instrumented Indentation," Journal of Research of the National Institute of Standards and Technology, Jul.-Aug. 2003, 108(4), 17 pages.

Vernik et al., "Ultrasonic Velocity and Anisotropy of Hydrocarbon Source Rocks," Geophysics, May 1992, 57(5), 9 pages.

Wang et al., "A Numerical Study of Factors Affecting the Characterization of Nanoindent ation on Silicon," Materials Science and Engineering: A, Feb. 25, 2007, 447(1), 10 pages.

Wang et al., "Iron Sulfide Scale Dissolvers: How Effective Are They?" Presented at the SPE Saudi Arabia section Annual Technical Symposium and Exhibition (SPE-168063-MS), Khobar, Saudi Arabia, May 19-22, 2013, 22 pages.

Wenk et al., "Preferred Orientation and Elastic Anisotropy of Illite-Rich Shale," Geophysics, Mar.-Apr. 2007, 72(2), 7 pages.

Wilson et al., "Fracture testing of bulk silicon microcantilever beams subjected to a side load," Journal of Microelectromechanical Systems, Sep. 1996, 5(3), 9 pages.

Wurster et al., "Characterization of the fracture toughness of microsized tungsten single crystal notched specimens," Philosophical Magazine, May 2012, 92(14), 23 pages.

Zeszotarski et al., "Imaging and Mechanical Property Measurements of Kerogen via Nanoindentation," Geochimica et Cosmochimica Acta, 2004, 68(20), 7 pages.

\* cited by examiner

CALIBRATION AND SIMULATION OF A WELLBORE LINER

TECHNICAL FIELD

This disclosure relates to a kinetic energy based process for calibrating a model and determining the burst and collapse pressures for a wellbore liner.

BACKGROUND

Drill rigs used for drilling and producing hydrocarbons from a wellbore. Drill rigs include a large number of components and tools that perform complex and time-consuming operations. Drilling a well is a challenging procedure due to the inability to see the trajectory of the well and the various rock formations that exist. During the drilling process, casings and liners are used to support the sidewalls of the wellbore. The harsh downhole conditions including stresses, pore pressures, cementing processes, geological formations, well pressures, and flow in the well give rise to complex loading conditions on the casings or liners and the cement that attaches the liners to the rock formations. Predicting the behavior of a liner in the wellbore under these complex loading conditions is challenging.

SUMMARY

The structural integrity and response of a liner is important for supporting the wellbore. The liner is also used to aid in the completion, stimulation and production of oil and gas wells. Under downhole conditions, a liner is subjected to pressure inside the pipe and stress loads on its outside boundary. If the inside pressure is too high, the liner will burst and fail in a burst mode. If the outside pressure is too high, the liner will yield in a collapse mode. If the material of the liner has compressive and tensile strengths that are known, and the pressure is distributed uniformly in the radial direction, its burst pressure and collapse/yield pressure can be analytically evaluated.

However, under downhole conditions, the pressure or load distribution on the liner is non-uniform, meaning that a closed-form analytical solution for the burst pressure and collapse/yield pressure of the liner may not exist. There is no general closed-form analytical solution for evaluating the loading capacity of a liner subjected arbitrary distributed loads on its outer boundary and/or inner boundary.

This specification describes methods for calibrating parameters of constitutive models for a liner of a wellbore and using the calibrated model to predict the response of the liner in complex wellbore environments. The method uses a numerical finite element model to calibrate the constitutive model. The calibrated model is then used to simulate the performance and failure of the line in non-uniform loading conditions that exist in a particular wellbore. The method is demonstrated using a frictionless Mohr-Coulomb material constitutive model with limited cohesion and tensile strength. The constitutive model uses two parameters, a tensile strength and a compressive strength, to indicate the plasticity behavior of the constitutive model. The onset of plasticity is used to denote the onset of failure in the numerical model.

The calibration process includes an initial estimate for the tensile strength and the compressive strength. The initial estimate is chosen arbitrary, but is sometimes determined from a manufacturer's specification or from a previous known solution. A finite element model is developed and used to simulate the structural response of the liner under two states: a burst pressure state, and a collapse pressure state. The burst pressure state represents an internally pressurized liner and the numerical model is run to failure. The collapse pressure state represents an externally pressurized liner and the numerical model is run to failure. The burst pressure capacity and collapse pressure capacity of the liner are usually provided in the manufacturer's specification (or technical data sheet) of the liner, but sometimes these values are determined through testing. The computational mesh is refined until the burst pressure and the collapse pressure are approximately independent of the mesh size. When there is confidence that the numerical model is sufficiently refined, the numerically predicted burst and collapse pressures are compared with the corresponding values provided in the manufacturer's specification of the liner. If a difference exists, the compressive and tensile strengths are updated and the simulation is recomputed. This process is repeated until the different between the numerical results and experimental results is very small. For example, if the difference between the burst and collapse pressure determined from the numerical model and the actual burst and collapse pressure is 1%, the numerical results are considered converged and the method is complete. The compressive and tensile strength properties of the liner are determined once the numerical model predicts the experimental or manufacture's results. The resulting tensile strength and the compressive strength of the material of the liner are also determined and output as part of the solution.

A novel aspect of this disclosure uses a kinetic energy value to aid in determining the onset of failure in the numerical model. Monitoring for a precipitous rise in kinetic energy in the numerical model is an indication that potential energy (or elastic energy) is being released and represents the onset of plastic deformation in a region of the numerical model. In some cases, tensile plasticity provides an additional or alternate indication that the onset of plastic deformation has been reached.

Once the constitutive model is calibrated and the compressive and tensile strengths are determined, the numerical model is used to predict the structural response in more complex loading conditions. These include diametrical compression of the liner and a non-uniform pressure applied to exterior surface of the liner. Since the numerical model and material properties are calibrated, the numerical model can give accurate predictions of failure in these complex loading conditions.

In order to predict the structural integrity of a liner with non-uniform loading, a computational numerical modeling and simulation procedure was developed to numerically predict the burst and collapse pressures for a liner. The numerical model is able to predict the structural integrity of the liner under both uniform and non-uniform loading conditions. The numerical model is able to predict the performance of the liner in a wellbore when the wellbore conditions are known and at least some of the material properties of the liner are known. The numerical model can be used to select a liner from various liner candidates. The numerical model can assist in determining optimal properties for the liner.

Methods for predicting a structural response and failure of a liner for a well can include receiving geometric properties of the liner, the geometric properties including an inner diameter of the liner and an outer diameter of the liner; receiving structural properties of the liner, the structural properties including an experimental burst failure pressure and an experimental collapse failure pressure, the experimental burst failure pressure defining a failure of the liner when the liner is subject to a uniform internal pressure applied on the inner diameter of the liner, the experimental collapse failure pressure defining a failure of the liner when the liner is subject to a uniform external pressure applied on the outer diameter of the liner; receiving material properties of the liner, the material properties including an elastic modulus of the liner; developing a numerical model of the liner, the numerical model representing the liner and including the received geometric properties, the received structural properties, and the received material properties, the numerical model further including a constitutive model; calibrating one or more parameters of the constitutive model representing the material of the liner, the calibrating including: determining a numerical burst pressure failure by simulating a burst pressure response of the numerical model when the liner is subject to a uniform internal pressure applied on the inner diameter of the liner; determining a numerical collapse failure pressure by simulating a collapse pressure of the numerical model when the liner is subject to a uniform external pressure applied on the outer diameter of the liner; and updating at least one of the one or more parameters of the constitutive model based on a difference between the numerical burst pressure failure and the experimental burst pressure failure and a difference between the numerical collapse pressure failure and the experimental collapse pressure failure; and simulating the structural response and failure of the numerical model subjected to an expected non-uniform pressure loading of the well, where the numerical model is used to predict the structural response and failure of the liner when installed in the well.

Methods for predicting a structural response and failure of a liner of a well can include calibrating one or more parameters of a constitutive model representing a material of the liner, the one or more parameters being part of a constitutive model, the one or more parameters including a compressive strength of the constitutive model and a tensile strength of the constitutive model, the calibrating including: determining a numerical burst pressure failure by simulating a burst pressure response of a numerical model of the liner when the liner is subject to a uniform internal pressure applied on an inner diameter of the liner, where the numerical burst pressure failure is determined by detecting a kinetic energy of the numerical model above a first threshold indicative of an onset of failure of the numerical model; determining a numerical collapse failure pressure by simulating a collapse pressure of the numerical model when the liner is subject to a uniform external pressure applied on an outer diameter of the liner, where the numerical collapse pressure failure is determined by detecting a kinetic energy of the numerical model above a second threshold indicative of an onset of failure of the numerical model; and updating at least one of the one or more parameters of the constitutive model based on a difference between the numerical burst pressure failure and an experimental burst pressure failure and a difference between the numerical collapse pressure failure and an experimental collapse pressure failure; and simulating the structural response and failure of the numerical model subjected to an expected non-uniform pressure loading of the well, where the numerical model is used to predict the structural response and failure of the liner when installed in the well.

Embodiments of these systems and methods can include one or more of the following features.

Some embodiments also include receiving an initial estimate of the one or more parameters of the constitutive model.

Some embodiments also include calibrating the one or more parameters of the constitutive model further includes iterating, using the updated at least one of the one or more parameters of the constitutive model, a simulation of the numerical model to determine a refined numerical burst pressure failure of the numerical model and a refined numerical collapse pressure failure of the numerical model.

Some embodiments also include calibrating the one or more parameters of the constitutive model further includes accepting at least one of the one or more parameters of the constitutive model if the difference between the numerical burst pressure failure and the experimental burst pressure failure is below a first threshold. In some cases, the first threshold is 5%.

Some embodiments also include calibrating the one or more parameters of the constitutive model further includes accepting at least one of the one or more parameters of the constitutive model if the difference between the numerical collapse pressure failure and the experimental collapse pressure failure is below a second threshold. In some cases, the second threshold is 5%.

Some embodiments also include accepting at least one of the one or more parameters of the constitutive model if (i) the difference between the numerical burst pressure failure and the experimental burst pressure failure is below a third threshold and (ii) the difference between the numerical collapse pressure failure and the experimental collapse pressure failure is below a fourth threshold.

Some embodiments also include monitoring a kinetic energy of the numerical model to determine an onset of failure of the numerical model.

Some embodiments also include detecting a kinetic energy of the numerical model above an energy threshold indicative of an onset of failure of the numerical model.

Some embodiments also include cases where the one or more parameters of a constitutive model includes a compressive strength of a constitutive model and a tensile strength of the constitutive model.

Some embodiments also include cases where the constitutive model is a frictionless Mohr-Coulomb material constitutive model.

Some embodiments also include cases where the non-uniform pressure loading of the well is at least in part caused by one or more formations.

Some embodiments also include cases where the non-uniform pressure loading of the well is at least in part caused by cement between the liner and one or more formations.

Some embodiments also include cases where the non-uniform pressure loading of the well is at least in part caused by a flow of oil in the liner.

Some embodiments also include cases where the non-uniform pressure loading of the well is at least in part caused by a completion condition of the liner.

Some embodiments also include cases where determining the numerical burst pressure failure is de-coupled from determining the numerical collapse failure pressure.

The systems and methods described in this specification provide various advantages.

A calibrated model for wellbore gives a higher confidence that the numerical simulations are accurate and gives a higher confidence for predicting failure of a liner in a well. In particular, the numerical simulation gives a higher confidence of accurately predicting the bursting mode of a liner and the collapse mode of a liner. This is important for modeling the complex loading cases present in wellbores, where failure of the liner can be catastrophic.

Monitoring the kinetic energy of a numerical simulation gives an accurate indication of the onset of such failure. Monitoring the kinetic energy can be performed non-graphically with a scripting language. This is advantageous is cases where a user may not be able to view the images of the numerical results and/or in cases where a programming language is used to iterate to determine the parameters of the constitutive model.

For ease of description, terms such as "upper", "lower", "top", "bottom" "left" and "right" are relative to the orientation of the features in the figures rather than implying an absolute direction. Furthermore, the term "liner" is used to denote a liner assembly of a well, such as a liner, casing, cement, and formation of the well. Therefore, "liner" should be construed more broadly than only a liner.

The details of one or more embodiments of these systems and methods are set forth in the accompanying drawings and the description below. Other features, objects, and advantages of these systems and methods will be apparent from the description and drawings, and from the claims.

DESCRIPTION OF DRAWINGS

FIG. 2A is a liner subject to a uniform internal pressure (burst pressure). FIG. 2B is a liner subject to a uniform external pressure (yield pressure). FIG. 2C is a liner subject to a non-uniform external pressure (collapse pressure). FIG. 2D is a liner subject to a non-uniform external pressure and a boundary condition.

FIG. 5A is the radial stress distribution. FIG. 5B is the tangential stress distribution. FIG. 5C is the history of unbalanced force in the system versus the applied internal pressure.

FIG. 6A is the radial stress distribution. FIG. 6B is the tangential stress distribution. FIG. 6C is the history of unbalanced force in the system versus the applied external pressure.

FIG. 7A is the history of unbalanced force in the system versus the applied compressive pressure. FIG. 7B is the plasticity indicator plot. FIG. 7C is the tangential stress distribution. FIG. 7D is the displacement vectors of the deformation.

FIG. 8A is the history of unbalanced force in the system versus the applied pressure. FIG. 8B is the plasticity indicator plot. FIG. 8C is the tangential stress distribution. FIG. 8D is the displacement vectors of the deformation.

FIG. 8E is the displacement vectors of the deformation. FIG. 8F is the plasticity indicator plot.

Like reference symbols in the various drawings indicate like elements.

DETAILED DESCRIPTION

This disclosure describes a modeling and calibration process for a liner of a wellbore. The process includes calibrating a constitutive model of the liner and the numerical model by numerically simulating loading cases and comparing results to known solutions. The process includes modeling complex non-uniform loading cases of the liner, using the calibrated numerical model, present in a wellbore. The entire process is used to give accurate numerical predictions of the structural response and failure of a liner of a wellbore under uniformly and non-uniformly distributed loads acting inside and outside of the liner.

Figure 1:
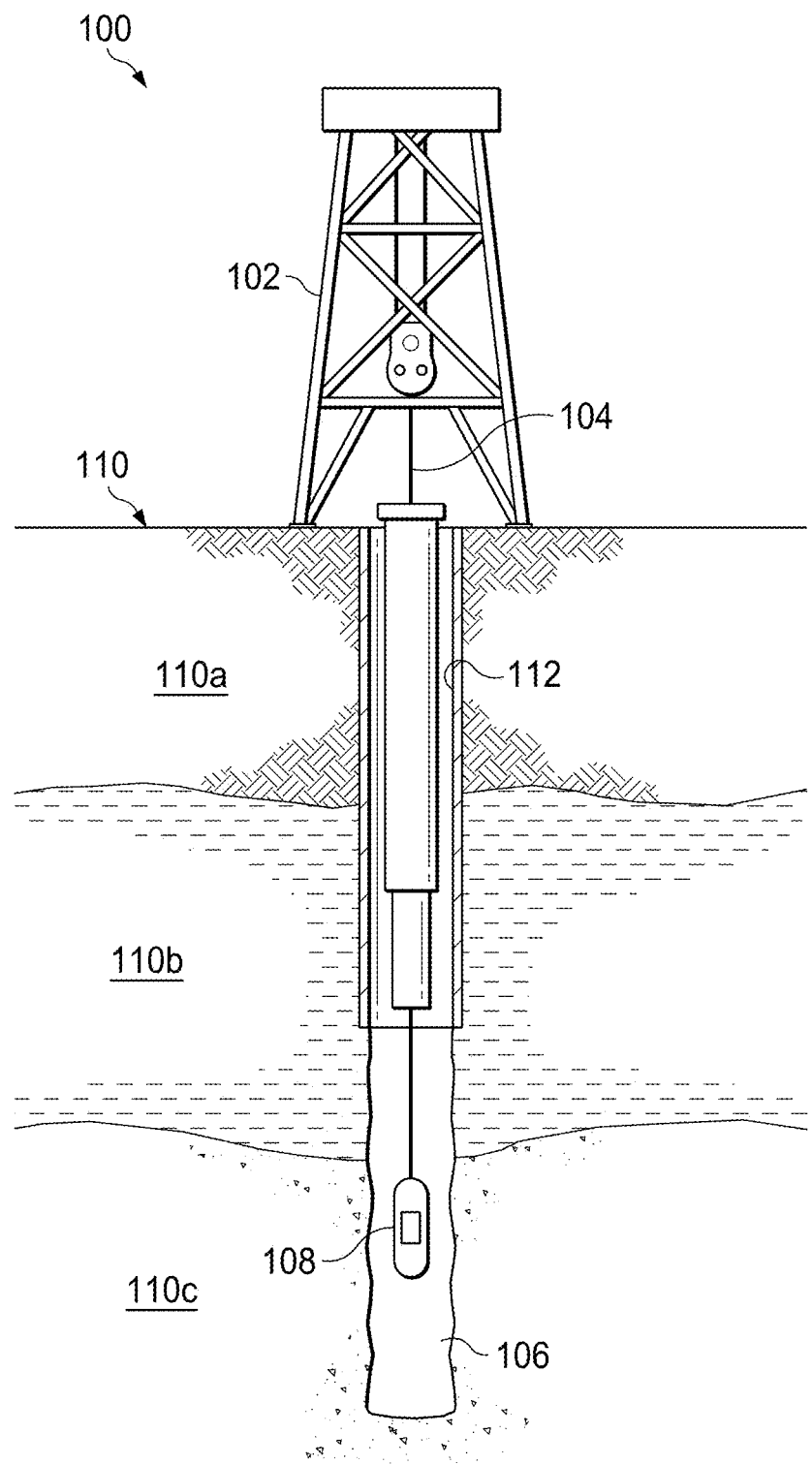
FIG. 1 is a schematic side view of an example well.

FIG. 1 is a schematic side view of a well 100. The well 100 includes a drill derrick 102 that supports the weight of and selectively positions a drill string 104 within a wellbore 106. The drill string 104 has a down-hole end connected to a drill bit 108 that drills the wellbore 106 through a formation 110. A rotational speed and a vertical depth of the drill bit 108 is controlled by a drill to control the cutting speed into the formation 110 and the wellbore 106 depth. The formation 110 includes various layers 110a, 110b, 110c. Each formation layer 110a, 110b, 110c is generally horizontal and represents different geophysical properties. In some cases, each formation layer 110a, 110b, 110c has a different set of rock mechanical properties. As the wellbore 106 is being formed, the drill bit 108 drills through each of these formations 110a, 110b, 110c which imparts varying stresses on the drill bit 108, the drill string 104, and the drill itself. While the wellbore 106 is vertical, the principles of this disclosure can also be applied to a deviated or horizontal wellbore as well.

During the drilling process, one or more liners 112 or casings are used to support the wellbore 106. The liners 112 are affixed to the formation 110 using cement. The liners 112 are tubular pipes and constructed out of steel, but other materials can be used. Since each of the formations 110a, 110b, 110c, can have different geomechanical properties, varying stresses are applied to the liners 112. Other influencing factors affect the stresses and pressures applied to the liners 112. For example, unequal in-situ stresses, an imperfect cementing process, and leakage of fluid in hydraulic fracturing stimulation affect the stresses and pressures applied to the liners 112. The load distribution on the external boundary of the liner 112 is usually non-uniform. Sometimes the varying stresses and pressures applied to the liner 112 cause the liner 112 to structurally fail, which is undesirable. A failed liner would need replacement and causes danger to the drilling equipment and people in the vicinity of the well.

To assess the structural response of the liner 112, various loading cases are considered. A calibration and validation process is performed to calibrate the constitutive model and validate the numerical model. This calibration and validation process is possible because the model is simulated in two cases where the solution is known. These two cases include a burst mode and a collapse mode. The calibrated and validated numerical model is then used to simulate the response under complex loading conditions of the wellbore. These conditions include diametrical compression and non-uniform compression with a portion of the liner constrained.

Figure 2A:
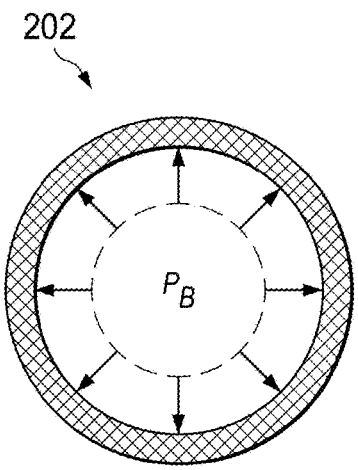
FIGS. 2A-2D are four loading cases for a liner model.

FIG. 2A is a 2D cross-sectional view 202 of a liner 112 subject to a uniform internal pressure $P_B$ applied to the inner diameter of the liner 112. The application of a uniform internal pressure $P_B$ simulates a "burst" failure of the liner 112. Burst failure occurs when the liner 112 cannot support the pressure and "bursts." This bursting is often rapid and catastrophic. Most liners 112 are provided with manufacturer data indicated a burst failure pressure. Alternatively, the burst failure pressure can be determined using destructive experiments. This case is used as part of the calibration and validation procedure of the numerical model.

Figure 2B:
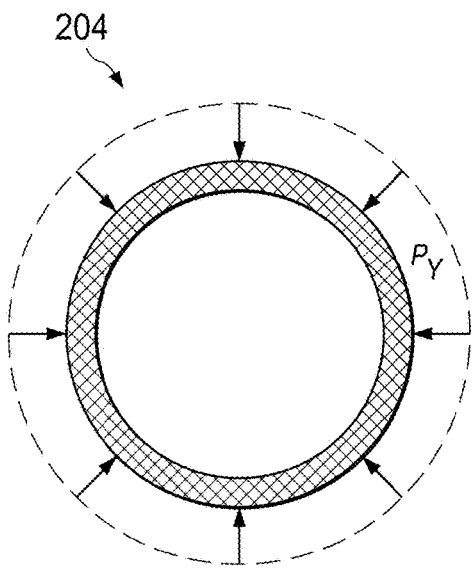

FIG. 2B is a 2D cross-sectional view 204 of a liner 112 subject to a uniform external pressure $P_Y$ applied to the outer diameter of the liner 112. The application of a uniform external pressure $P_Y$ simulates a "collapse" failure of the liner 112. Collapse failure occurs when the liner 112 cannot support the pressure and "collapses." This collapsing is also rapid and catastrophic. Most liners 112 are provided with manufacturer data indicated a collapse failure pressure. Alternatively, the collapse failure pressure can be determined using destructive experiments. This case is also used as part of the calibration and validation procedure of the numerical model.

Figure 2C:
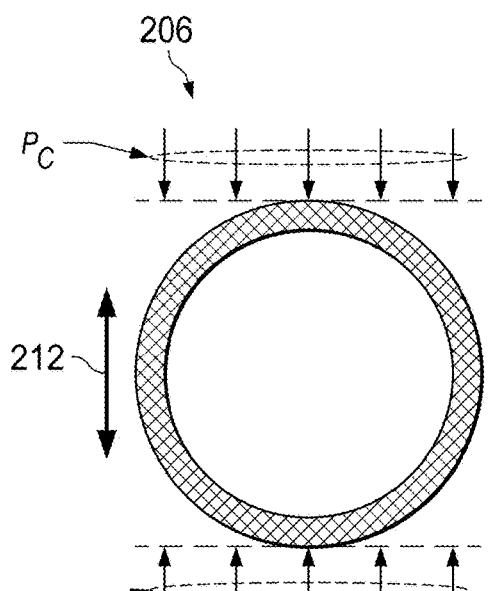

FIG. 2C is a 2D cross-sectional view 206 of a liner 112 subject to a diametrical compression $P_C$ of the liner 112. Diametrical compression of the liner 112 represents stresses acting on the liner in the wellbore completion condition. Diametrical compression is a non-physical loading case to illustrate that the liner 112 fails at a lower stress magnitude when a non-axisymmetric load is applied to the liner 112.

Figure 2D:
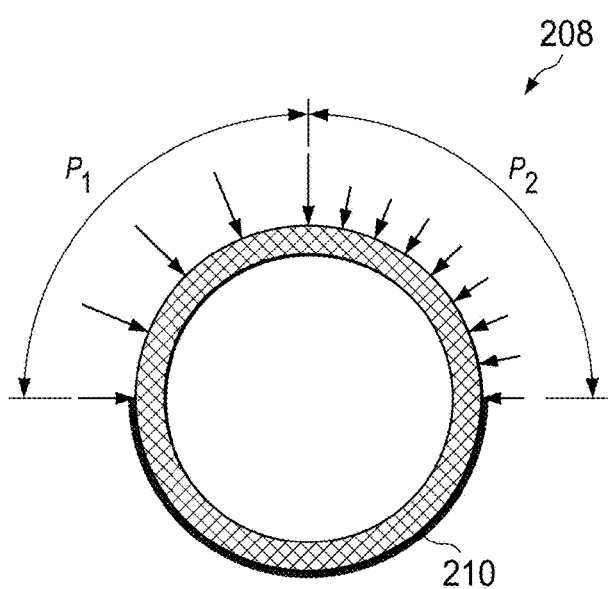

FIG. 2D is a 2D cross-sectional view 208 of a liner 112 subject to a non-uniform pressure loading $P_1$ over a portion of the outer circumference, $P_2$ over another portion of the outer circumference, and boundary condition 210 on another portion of the outer circumference. The liner 112 may experience the loading condition shown in FIG. 2D in the downhole condition. For example, FIG. 2D can represent a case where the bottom half of the liner 112 is cemented to the well and cannot move (boundary condition 210). It can also represent a case where a cavity on the upper left of the liner 112 is filled with high-pressure fluid during hydraulic fracturing (loading $P_1$) and where a rock mass imposes mechanical pressure on the upper-right section of the liner 112 (loading $P_2$).

The tensile strength parameter of the frictionless Mohr-Coulomb constitutive model is calibrated. The tensile strength of the model is calibrated by applying a uniform internal pressure to the liner model and gradually increasing the pressure until the model indicates failure (as seen in FIG. 2A). As the pressure increases, an amount of stored potential energy (or elastic energy) in the model increases. When failure occurs, this energy is quickly converted to kinetic energy indicative of an energy release of the model. Monitoring for this precipitous rise in kinetic energy of the numerical simulation is indicative of an onset of failure of the model. A plot of kinetic energy versus applied pressure is monitored to indicate failure. A difference in the numerical onset of failure compared to the experimental (or manufacturer-provided) failure is accounted for by updating the tensile strength of the constitutive model accordingly and re-running the numerical simulation. For example, if a tensile strength parameter of X is used and gives a numerical onset of failure at Y−20%, where the experimental failure is Y, this indicates that the tensile strength is too low and should be increased so Y−20% is closer to Y. For example, the tensile strength parameter is updated to be X+20% and the numerical simulation is recomputed.

The compressive strength of the constitutive model is calibrated similarly to the tensile strength. The compressive strength is calibrated by applying a uniform external pressure to the liner model and gradually increasing the pressure until the model indicates a failure (as seen in FIG. 2B). Failure is determined by monitoring for the precipitous rise in kinetic energy of the numerical simulation which is indicative of an onset of failure of the model. A plot of kinetic energy versus applied pressure is monitored to indicate failure. A difference in the numerical onset of failure compared to the experimental (or manufacturer-provided) failure is accounted for by updating the compressive strength of the constitutive model accordingly and re-running the numerical simulation. For example, if a compressive strength parameter of X is used and gives a numerical onset of failure at Y−20% where the experimental failure is Y, then the compressive strength parameter is updated to be X+20% and the numerical simulation is recomputed.

Once the constitutive model is calibrated (in other words, the compressive and tensile strength properties are determined) and the numerical model is validated, the non-uniformly distributed loads expected in the well 100 are applied in the inside and/or outside circumference of the liner model according to the expected pressure loading inside the wellbore 106.

Figure 3:
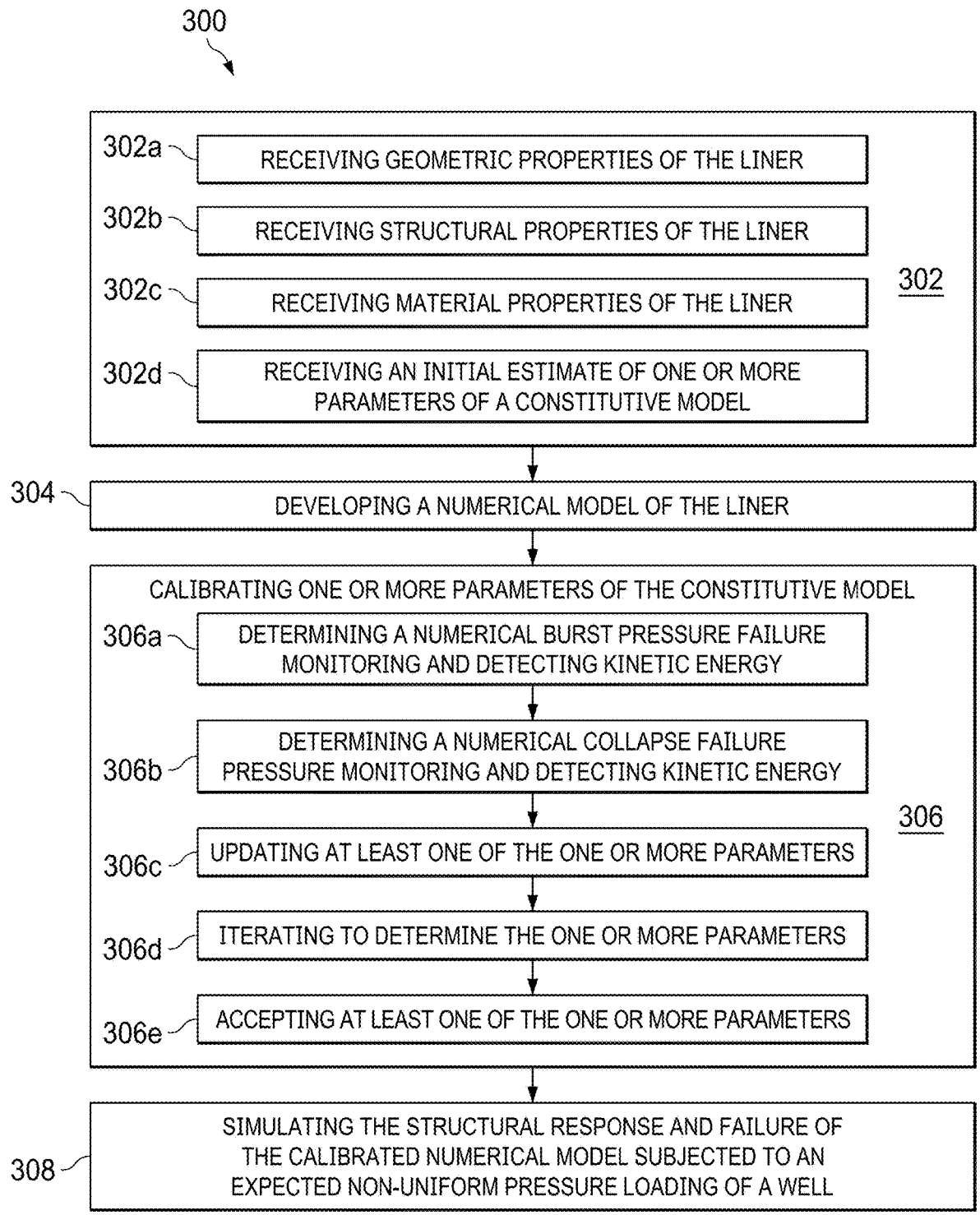
FIG. 3 is a flow chart of the modeling and calibration process.

FIG. 3 is a flowchart of the modeling and calibration process 300.

Step 302 represents the inputs to the process. The inputs include receiving geometric properties of the liner (step 302a). The geometric properties include an inner diameter of the liner and an outer diameter of the liner. A length of the liner may also be provided. The inputs include receiving structural properties of the liner (step 302b). The structural properties include an experimental burst failure pressure and an experimental collapse failure pressure. The experimental burst failure pressure defines a failure of the liner when the liner is subject to a uniform internal pressure applied on the inner diameter of the liner. The experimental collapse failure pressure defines a failure of the liner when the liner is subject to a uniform external pressure applied on the outer diameter of the liner. In some cases, the experimental burst failure pressure and the experimental collapse failure pressure is provided by a manufacturer of the liner. In some cases, the experimental burst failure pressure and the experimental collapse failure pressure is determined through experimental testing.

The inputs include receiving material properties of the liner (step 302c). The material properties include an elastic modulus of the liner, Poisson's ratio, compressive strength, and tensile strength. In some cases, the material properties include an initial estimate of one or more parameters of a constitutive model of the liner (step 302d). In some cases, the constitutive model is a frictionless Mohr-Coulomb material constitutive model.

Step 304 represents developing a numerical model of the liner. The numerical model represents the liner and includes the received geometric properties, the received structural properties, and the received material properties. The numerical model is developed on a computer. In some cases, the numerical model is developed using the FLAC software.

Step 306 represents calibrating one or more parameters of the constitutive model representing the material of the liner. The calibrating process includes determining the tensile strength property of the liner by simulating and determining a numerical burst pressure failure (step 306a) of the numerical model when the liner is subject to a uniform internal pressure applied on the inner diameter of the liner. The calibration and modeling process includes monitoring a kinetic energy of the burst pressure numerical simulation to determine an onset of failure of the numerical model. In some cases, detecting the kinetic energy of the burst pressure numerical simulation above an energy threshold is indicative of an onset of failure of the numerical model.

The calibration process includes determining a compressive strength property of the liner by simulating and determining a numerical collapse failure pressure (step 306b) of the numerical model when the liner is subject to a uniform external pressure applied on the outer diameter of the liner. The calibration and modeling process includes monitoring a kinetic energy of the collapse pressure numerical simulation to determine an onset of failure of the numerical model. In some cases, detecting the kinetic energy of the collapse pressure numerical simulation above an energy threshold is indicative of an onset of failure of the numerical model.

The calibration process includes updating at least one of the one or more parameters of the constitutive model (step 306c). The updating is based on a difference between the numerically determined burst pressure failure and the experimental burst pressure failure and a difference between the numerically determined collapse pressure failure and the experimental collapse pressure failure. In some cases, the calibration process includes iterating to determine the one or more parameters (the compressive strength property and the tensile strength property) (step 306d). The iterating process uses the updated at least one of the one or more parameters of the constitutive model and updates the simulation of the numerical model to determine a collapse strength of the numerical model.

In some cases, the calibration process includes accepting at least one of the one or more parameters (step 306e). In some cases, accepting at least one of the one or more parameters of the constitutive model is performed if the difference between the numerical burst pressure failure and the experimental burst pressure failure is below a threshold. In some cases the threshold is 5%, but in some cases, 2% or 1% is used. In some cases, accepting at least one of the one or more parameters of the constitutive model is performed if the difference between the numerical collapse pressure failure and the experimental collapse pressure failure is below a threshold. In some cases the threshold is 5%, but in some cases, 2% or 1% is used. In some cases, the thresholds are the same, but in some cases, the thresholds are different. The model is also decoupled, so that when the model used to numerically determine the compressive strength of the material, the tensile strength property of the material does not need to be changed, and vice versa.

Step 308 represents simulating the structural response and failure of the calibrated numerical model. In some cases, the numerical model is subjected to an expected non-uniform pressure loading of the well. In some cases, the numerical model is used to predict the structural response and failure of the liner when installed in the well. In some cases, the non-uniform pressure loading of the well is at least in part caused by one or more formations. In some cases, the non-uniform pressure loading of the well is at least in part caused by cement between the liner and one or more formations. In some cases, the non-uniform pressure loading of the well is at least in part caused by a flow of oil in the liner. In some cases, the non-uniform pressure loading of the well is at least in part caused by a completion condition of the liner.

Figure 4:
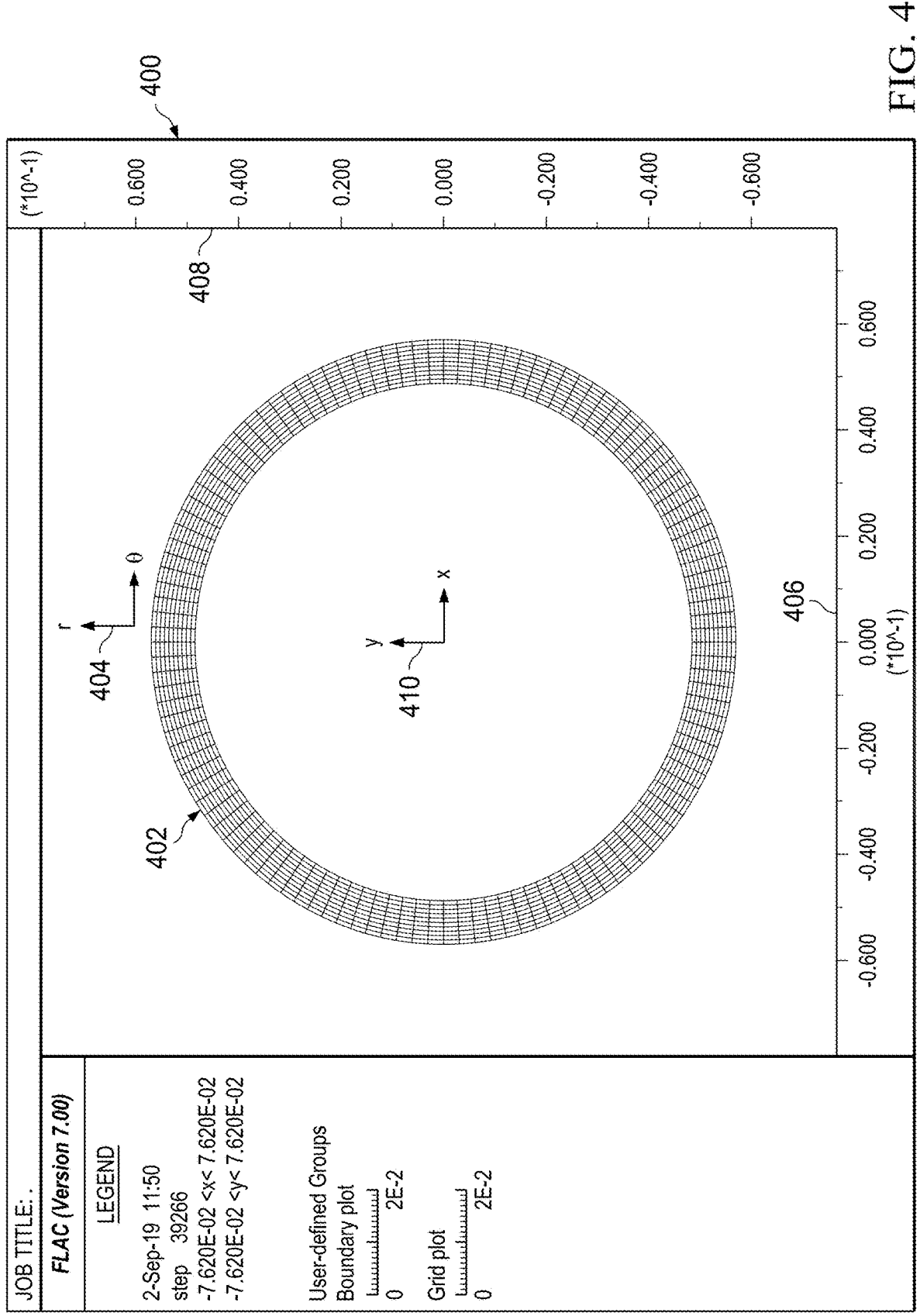
FIG. 4 is a computational model of the liner.

FIG. 4 is a computational model 402 representing the liner 112 in the finite element program FLAC 400. The liner 112 has an outer diameter (OD), inner diameter (ID), and a length. The length of the liner 112 is assumed infinite using a plane strain assumption. The model 402 is discretized uniformly using finite elements. The model 402 is solved with quasi-static loading, but dynamic loading is simulated in cases when the loading rates are high enough that accounting for mass and inertia is important. When dynamic loading is considered, artificial damping is used to dampen abrupt changes in kinetic energy. The mesh of the finite elements is sufficiently refined to obtain accurate results.

FIG. 4 shows the model 402 with 10 finite elements in the radial direction (r) and 120 elements in the tangential direction (θ) as depicted by the polar coordinate system 404. A Cartesian coordinate system 410 is also used to represent the position of the model. The position information includes a horizontal direction (x) 406 and a vertical direction (y) 408. The geometric and mechanical properties of the liner 112 are tabulated in Table 1.

TABLE 1

Geometric and mechanical properties of the liner

| Property | Value |
|---|---|
| OD (cm) | 11.43 |
| ID (cm) | 9.72 |
| Young's Modulus (GPa) | 200 |
| Poisson's Ratio | 0.3 |
| Yield Strength (GPa) | 0.25 |
| Burst Pressure (MPa) | 113 |
| Tensile Strength (MPa) | [700] |
| Compressive Strength (MPa) | [700] |

Table 1 represents the known geometric and material properties for the liner 112. These properties include a Young's modulus (E), a Poisson's ratio (v), a yield strength and a burst pressure of the liner 112. The tensile strength and compressive strength are best-estimated beforehand and determined through the calibration procedure. Values in brackets "[●]" represent an initial estimate. Together, these properties are used to define a constitutive model for the liner 112. In some cases, these properties are used to define a frictionless Mohr-Coulomb material with limited cohesion and tensile strength. The tensile strength and compressive strength represent cohesive properties of the constitutive model.

The process begins by assigning the initial estimates for compressive strength and tensile strength to the material in the liner model and performing the first calibration process.

Figure 5A:
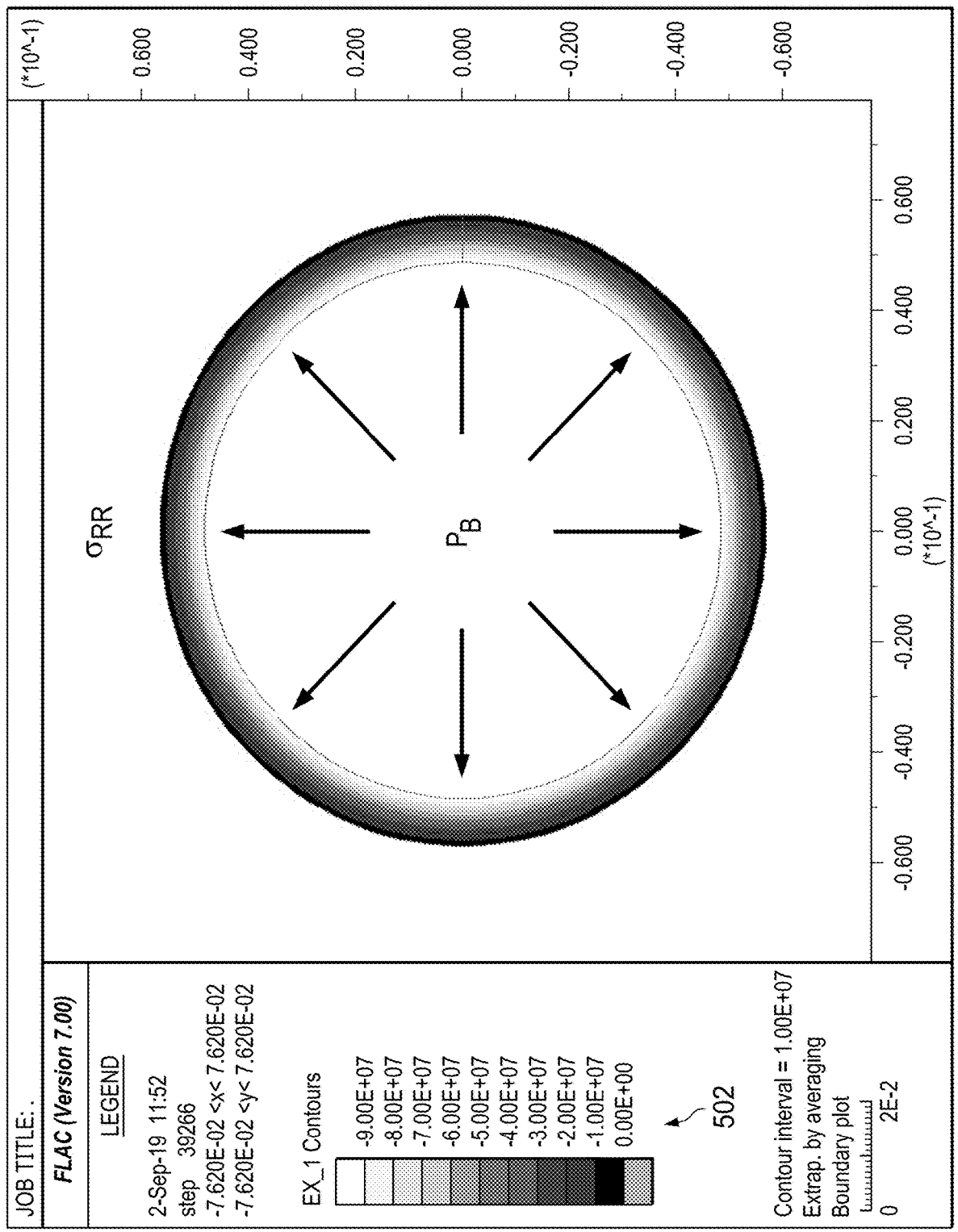
FIGS. 5A-5C are the numerical simulation results for the liner model subject to the conditions of FIG. 2A with an applied internal pressure of 100 MPa.
Figure 5B:
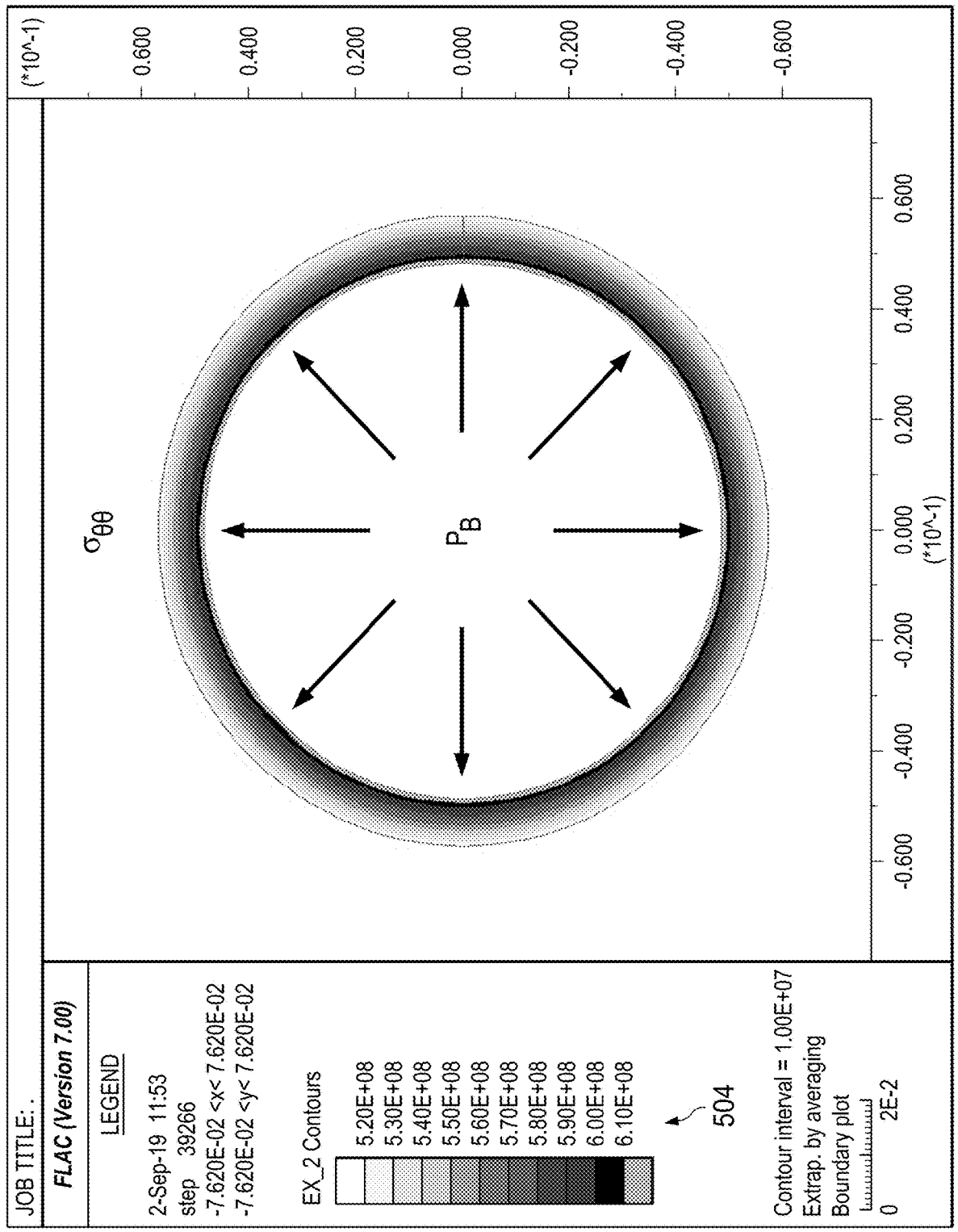
Figure 5C:
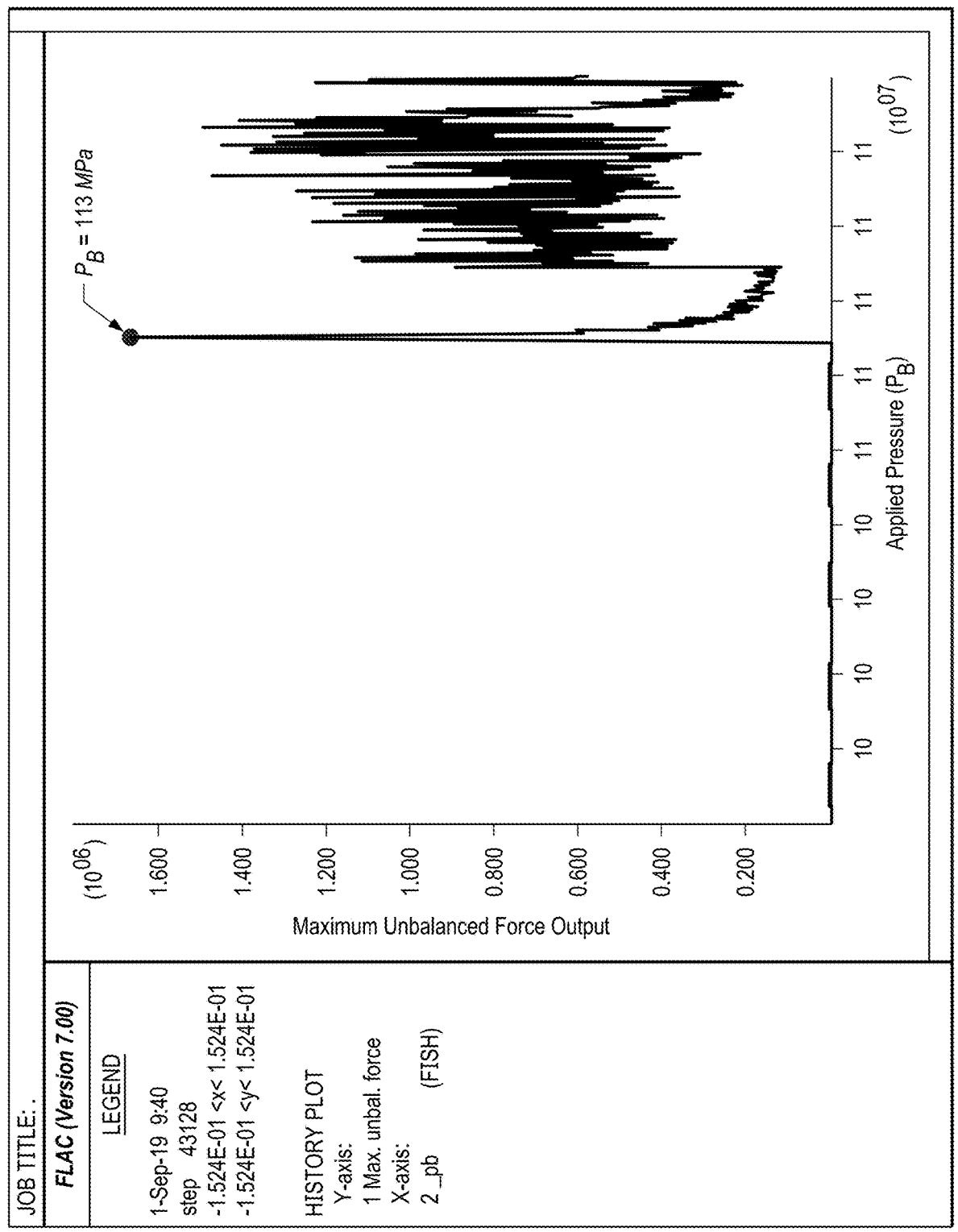

FIG. 5A-5C are the numerical simulation results for the case subjected to a uniform internal pressure $P_B$ applied to the inner diameter of the liner 112 (as seen in FIG. 2A). The applied pressure is $P_B$=100 MPa and is applied to the inside circumference of the liner model. The model is then solved for static equilibrium to obtain the stresses in the liner.

FIG. 5A is a contour of the radial stress ($\sigma_{RR}$) distribution in the model with $P_B$=100 MPa. The magnitude of the stress is represented by the contour levels 502. A compressive radial stress is indicated by a negative value and a tensile radial stress is indicated by a positive value. FIG. 5A indicates that the radial stress is maximum at the inner boundary and minimum at the outer boundary. The maximum radial stress is compressive and is about $\sigma_{RR}$=−90 MPa at the inner boundary. The radial stress is compressive everywhere in the model for this case.

FIG. 5B is a contour of the tangential stress ($\sigma_{\theta\theta}$) distribution in the model with $P_B$=100 MPa. The magnitude of the stress is represented by the contour levels 504. A compressive tangential stress is indicated by a negative value and a tensile tangential stress is indicated by a positive value. FIG. 5B indicates that the tangential stress is a maximum at the inner boundary and minimum at the outer boundary. The maximum tangential stress is tensile and is about $\sigma_{\theta\theta}$=610 MPa at the inner boundary. The tangential stress is tensile everywhere in the model for this case. This is important since this calibration simulation is designed to substantially test for a tensile failure state.

FIG. 5C is a line plot of the maximum unbalanced force output in the simulation versus the applied internal pressure ($P_B$). The unbalanced force quantifies the non-equilibrium state at each grid-point in the numerical model and represents the kinetic energy in the numerical model. In this case, the quantitative amount of kinetic energy is not used because the solution is solved quasi-statically and the energy is dampened by artificial damping. The applied internal pressure is slowly increased beyond $P_B$=100 MPa until failure occurs. The maximum unbalanced force output is small ($\ll 10^5$) at the beginning of the simulation up to about 113 MPa where the maximum unbalanced force output dramatically increases to about $1.7 \times 10^6$. This precipitous spike represents a sudden release of kinetic energy through the development of tensile cracks initiating in the finite elements. This is indicative of failure in the model. The maximum unbalanced force in the model is generally small until plastic yielding occurs which emits kinetic energy. At this point, the maximum unbalanced force suddenly increases. An algorithm implemented in the software is used to monitor the maximum unbalanced force.

For this example, the numerical simulation prediction of failure at $P_B$=113 MPa is identical to the burst pressure provided in Table 1 and is an indication that the initial estimate of the tensile strength of liner of 700 MPa was an accurate estimate. However, oftentimes, one would make an initial determination of the tensile strength, perform the simulation, observe a difference between the predicted failure pressure and the manufacturer's failure pressure, refine the tensile strength estimate, and iterate until a difference between the predicted failure pressure and the manufacturers failure pressure is below a threshold. Once this difference is below a threshold, the tensile strength is calibrated.

Once the tensile strength is calibrated, this process continues by assigning the initial estimate for compressive strength of the material in the liner model and performing the second calibration process. The second calibration process is a collapse test simulation which follows substantially the same process as the burst test calibration previously described, however, the pressure load is applied on the exterior boundary of the model instead of being applied on the internal boundary.

Figure 6A:
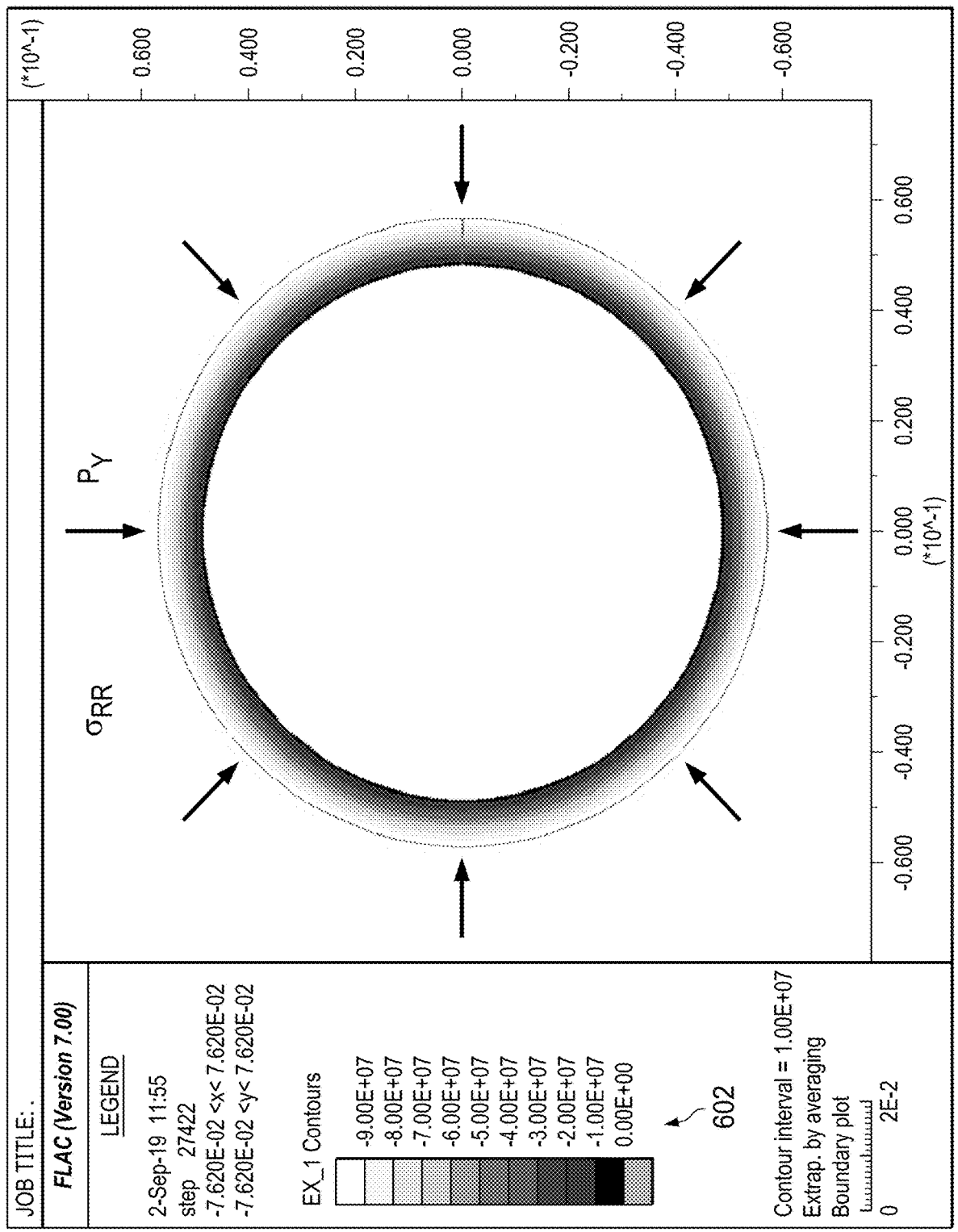
FIGS. 6A-6C are the numerical simulation results for the liner model subject to the conditions of FIG. 2B with an applied external pressure of 100 MPa.
Figure 6B:
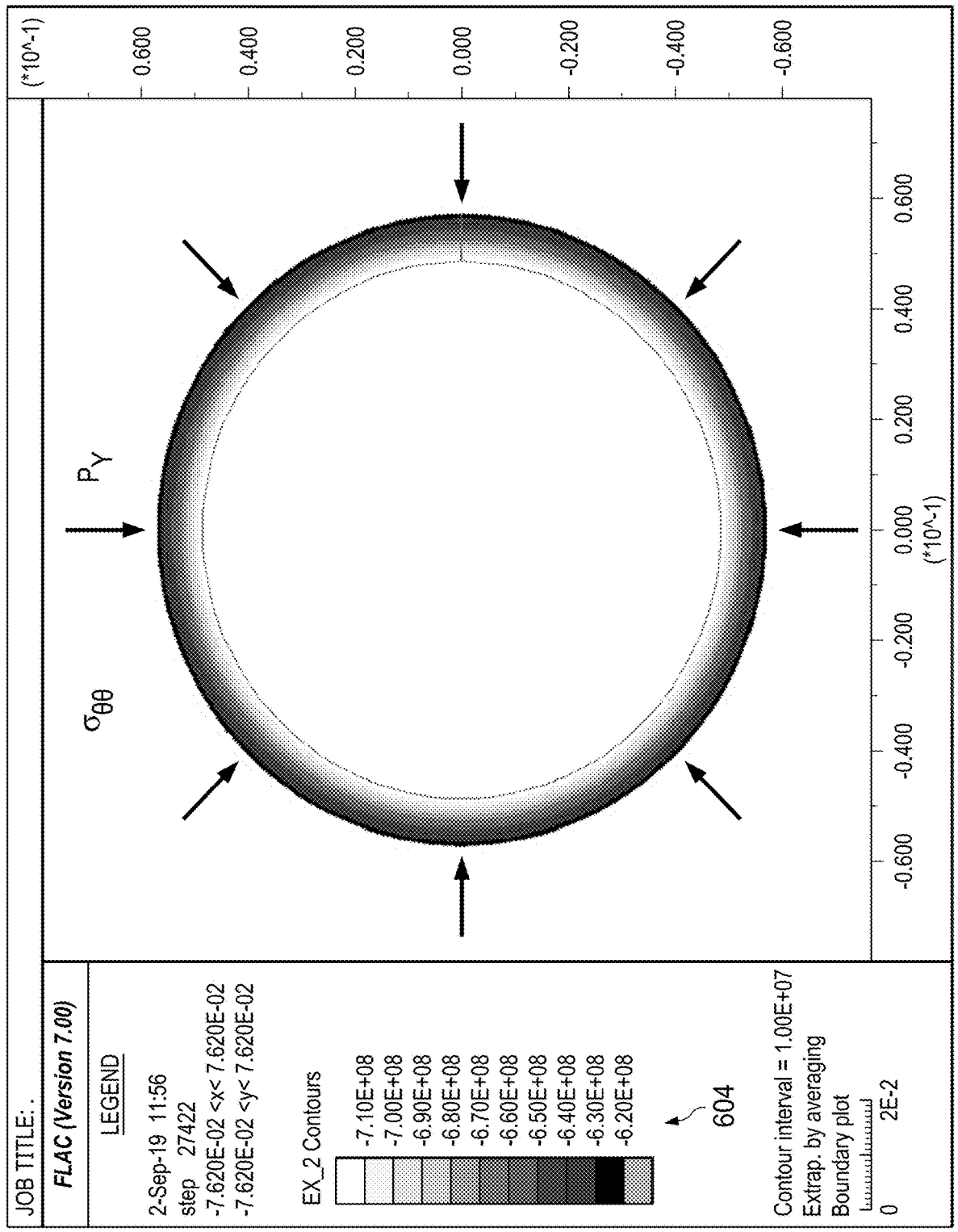
Figure 6C:
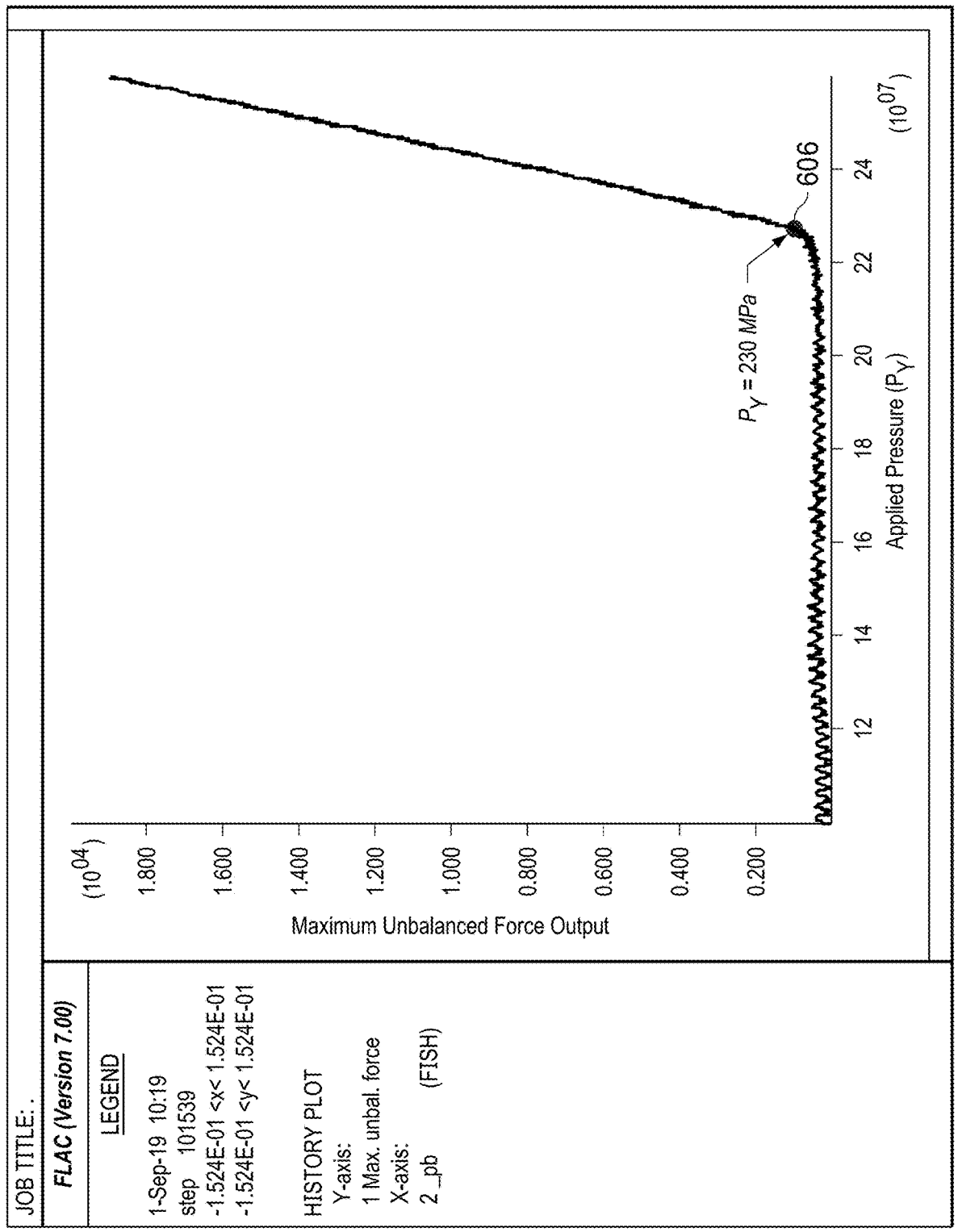

FIG. 6A-6C are the numerical simulation results for the case subjected to a uniform external pressure $P_Y$ applied to the outer diameter of the liner 112 (as seen in FIG. 2B). The applied pressure is $P_Y$=100 MPa and is applied to the inside circumference of the liner model. The model is then solved for static equilibrium to obtain the stresses in the liner.

FIG. 6A is a contour of the radial stress ($\sigma_{RR}$) distribution in the model with $P_Y$=100 MPa. The magnitude of the stress is represented by the contour levels 602. A compressive radial stress is indicated by a negative value and a tensile radial stress is indicated by a positive value. FIG. 6A indicates that the radial stress is maximum at the outer boundary and minimum at the inner boundary, which is opposite of the previous case with an internal pressure. The maximum radial stress is compressive and is about $\sigma_{RR}$=-90 MPa at the outer boundary. The radial stress is also compressive everywhere in the model for this case.

FIG. 6B is a contour of the tangential stress ($\sigma_{\theta\theta}$) distribution in the model with $P_Y$=100 MPa. The magnitude of the stress is represented by the contour levels 604. A compressive tangential stress is indicated by a negative value and a tensile tangential stress is indicated by a positive value. FIG. 6B indicates that the tangential stress is a maximum at the inner boundary and minimum at the outer boundary, which is similar to the previous case with an internal pressure but the tangential stress has changed sign and is now compressive in this case. The maximum tangential stress is compressive and is about $\sigma_{\theta\theta}$=-710 MPa at the inner boundary. The tangential stress is compressive everywhere in the model for this case. This is important since this calibration simulation is designed to substantially test for a compressive failure state. Tangential stress is compressive everywhere under axisymmetric compressive loading.

FIG. 6C is a line plot of the maximum unbalanced force output in the simulation versus the applied internal pressure ($P_Y$). The applied external pressure is slowly increased beyond $P_Y$=100 MPa until failure occurs. As with the previous case with an internal pressure, the maximum unbalanced force output is small ($\ll 10^4$) at the beginning of the simulation. The maximum unbalanced force output begins to increase when the external pressure reaches about 230 MPa where the maximum unbalanced force output begins to rise. Unlike the internal pressure case, the maximum unbalanced force output representing the kinetic energy increases gradually and linearly after compressive shear yielding initiates. The data point 606 where the kinetic energy transitions from a flat region to a sloped region indicates the onset of yielding in the liner model. This onset of yield is associated with the yield pressure limit of the liner. This is also indicative of failure in the model.

The yield pressure ($P_Y$) of 0.23 GPa predicted by the model is close to the initially estimated yield pressure of 0.25 GPa listed in Table 1. This is an 8% difference. The process can either be continued to decrease this difference or terminated. For example, if the method used a 5% difference threshold, the tensile and compressive strength properties of the liner would be updated and the numerical solution would be recomputed.

Oftentimes, one would make an initial determination of the compressive strength, perform the simulation, observe a difference between the predicted failure pressure and the manufacturers failure pressure, refine the compressive strength estimate, and iterate until a difference between the predicted failure pressure and the manufacturers failure pressure is below a threshold. Once this difference is below a threshold, the compressive strength is calibrated.

In some cases, the compressive strength and the tensile strength of the liner material are determined together or in a staggered approach. The simulations are repeated until the model-predicted collapse pressure and the model-predicted burst pressure match with the manufacturer's values.

Once compressive strength and the tensile strength are calibrated, the constitutive model is used in simulations with non-uniform loading to determine failure of the liner in more complex loading conditions that do not have an analytical solution. Downhole conditions of a well give rise to this complex loading due to various factors. Some of the factors include (i) the heterogeneity in the formation, (ii) unequal in-situ stresses, (iii) imperfect connection between the liner and the formation (for example, the cementing process between the liner and the formation may have been performed imperfectly), and (iv) leakage of fluid in hydraulic fracturing stimulation.

FIG. 7A-7D are the numerical simulation results for the case subjected to a squeezing or collapse pressure $P_C$ applied in the vertical direction (direction 212 as seen in FIG. 2C). This collapse pressure represents the liner in the wellbore completion condition and the model is used to evaluate the integrity of the liner in the given completion condition of the well. The applied pressure is $P_C$=100 MPa and is applied as a vertical pressure of the liner model. The model is then solved for static equilibrium to obtain the stresses in the liner.

Figure 7A:
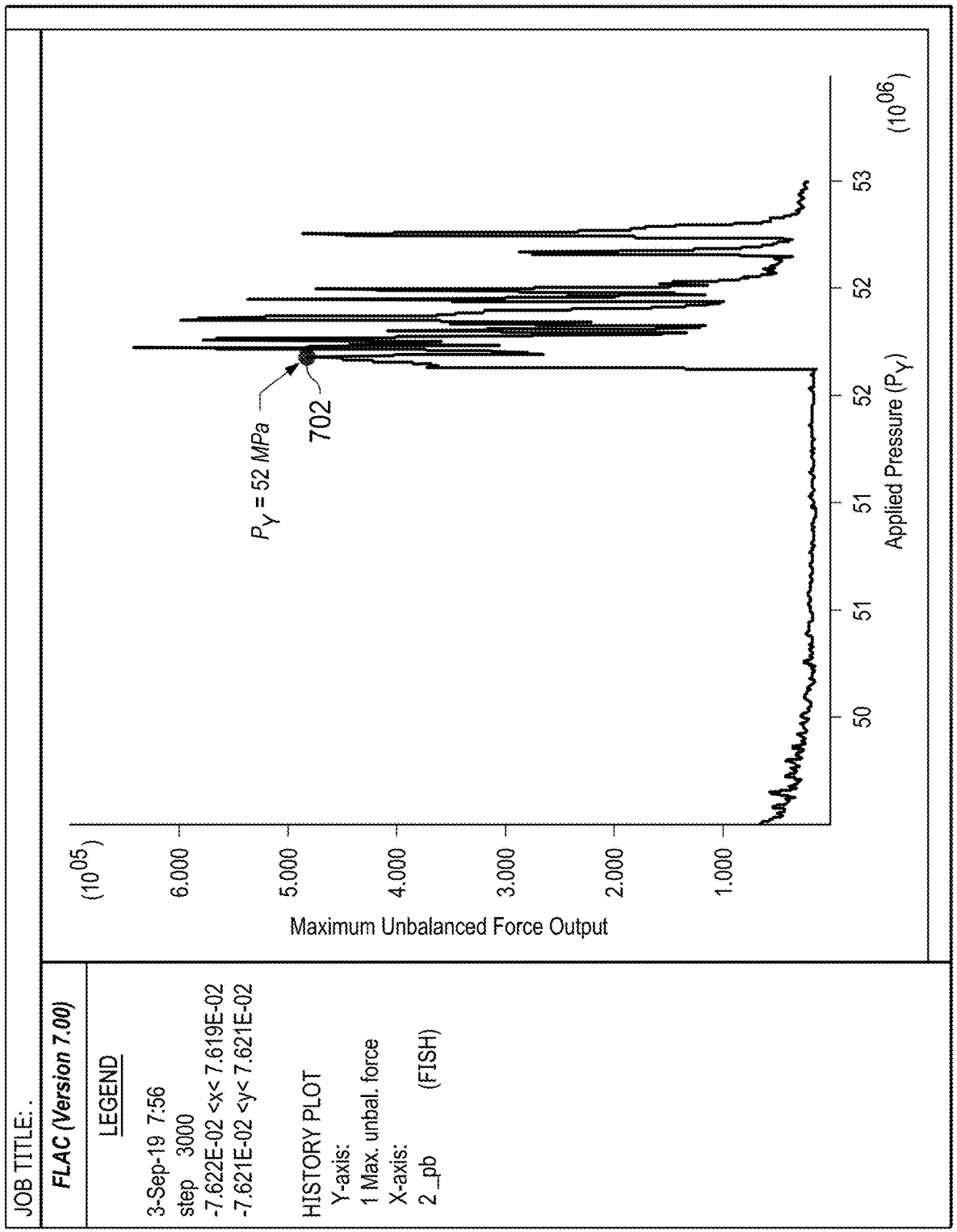
FIGS. 7A-7D are the numerical simulation results for the liner model subject to the conditions of FIG. 2C with an applied compressive pressure of 56 MPa.

FIG. 7A is a line plot of the maximum unbalanced force output in the simulation versus the applied vertical pressure ($P_Y$). The applied vertical pressure is slowly increased until failure occurs. The maximum unbalanced force output is small (<$10^5$) at the beginning of the simulation. The maximum unbalanced force output abruptly increases when the vertical pressure ($P_Y$) reaches about 52 MPa. This is shown with marker 702. This abrupt increase represents a release of kinetic energy and is associated with the compression limit of the liner. This is also indicative of failure in the model.

Figure 7B:
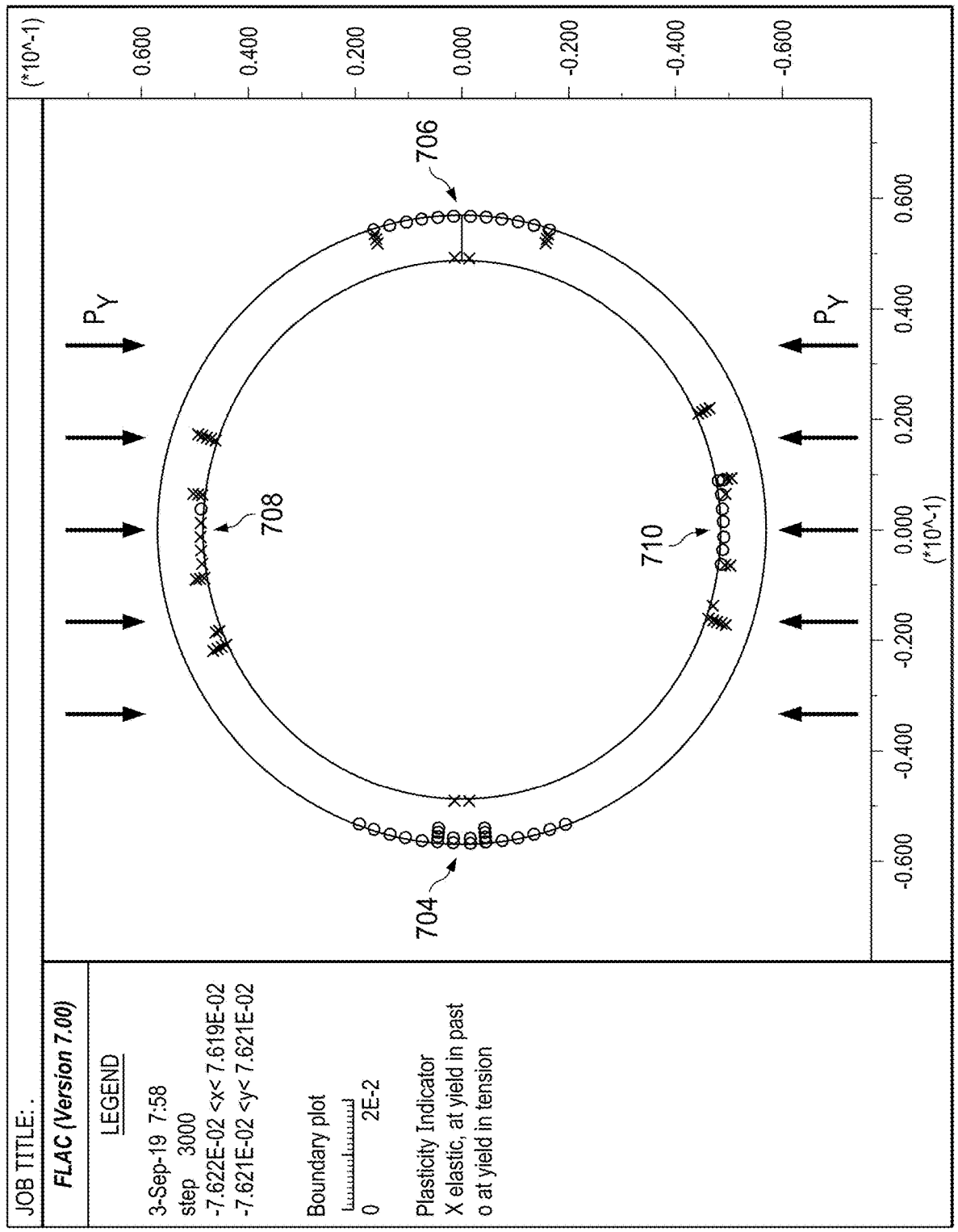
Figure 7C:
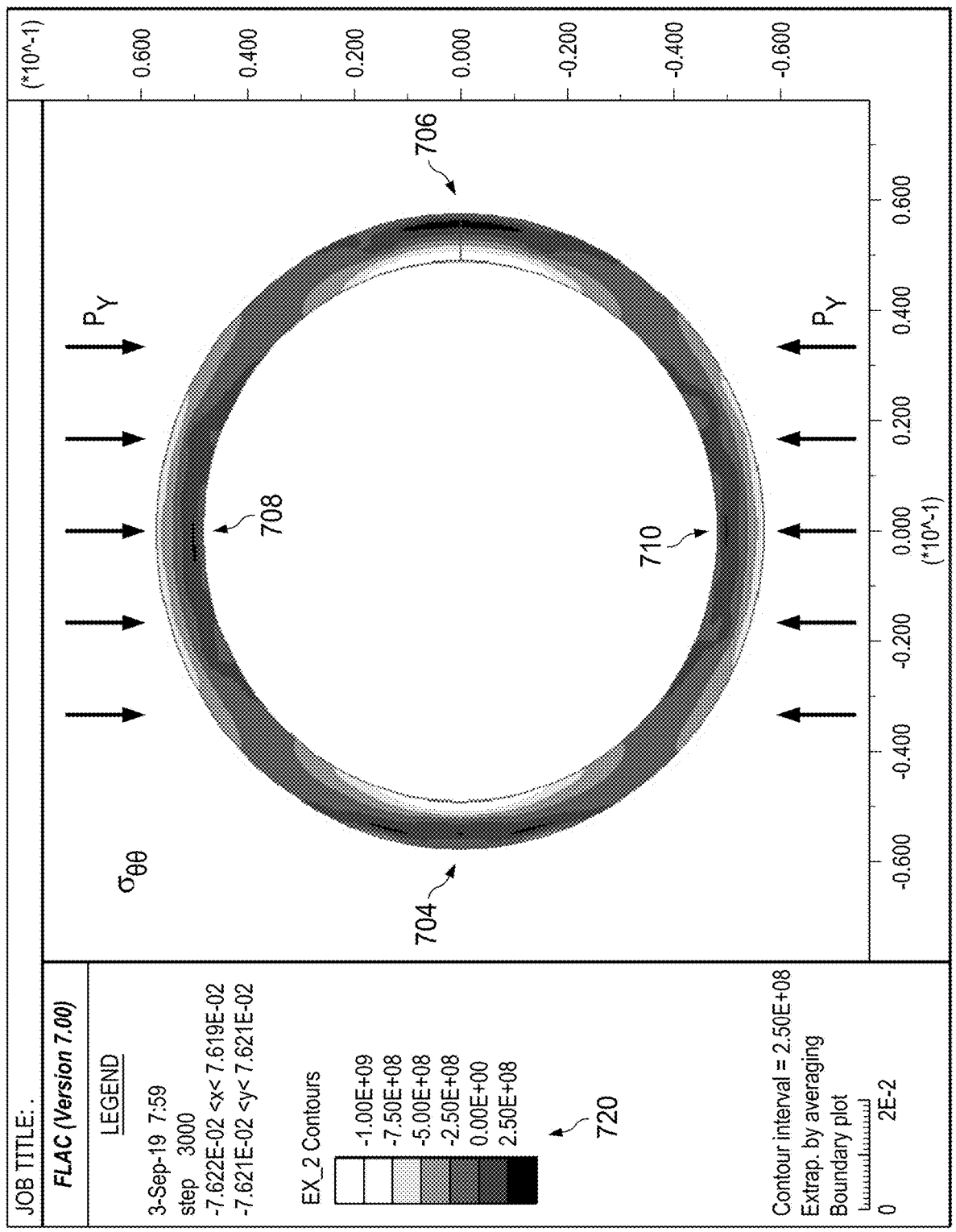

FIG. 7B is a plasticity indicator plot representing regions of the model that have yielded in tension (denoted by circle markers) when the vertical pressure of $P_Y$=53 MPa is applied to the model. Additionally, regions of the model that have exceeded tensile failure are reported by the kinetic energy curve and denoted by 'x' markers. Despite being loaded in compression, the liner fails by the development of tensile cracks. Tensile cracks initiate from the horizontal crown 704, 706 of the liner and vertical invert areas 708, 710 of the liner. These crown represents the inner circumference on the roof of the inside hole of the liner and the invert area represents the inner circumference at the floor of the inside hole of the liner FIG. 7C is a contour of the tangential stress ($\sigma_{\theta\theta}$) distribution in the model when the vertical pressure of $P_Y$=53 MPa is applied to the model. The magnitude of the stress is represented by the contour levels 720. A compressive tangential stress is indicated by a negative value and a tensile tangential stress is indicated by a positive value. FIG. 7C indicates that the tangential stress is in tension in the crown regions 704, 706 and invert areas 708, 710 of the liner. This tensile stress result is in agreement with the plasticity indicators seen in FIG. 7B.

Figure 7D:
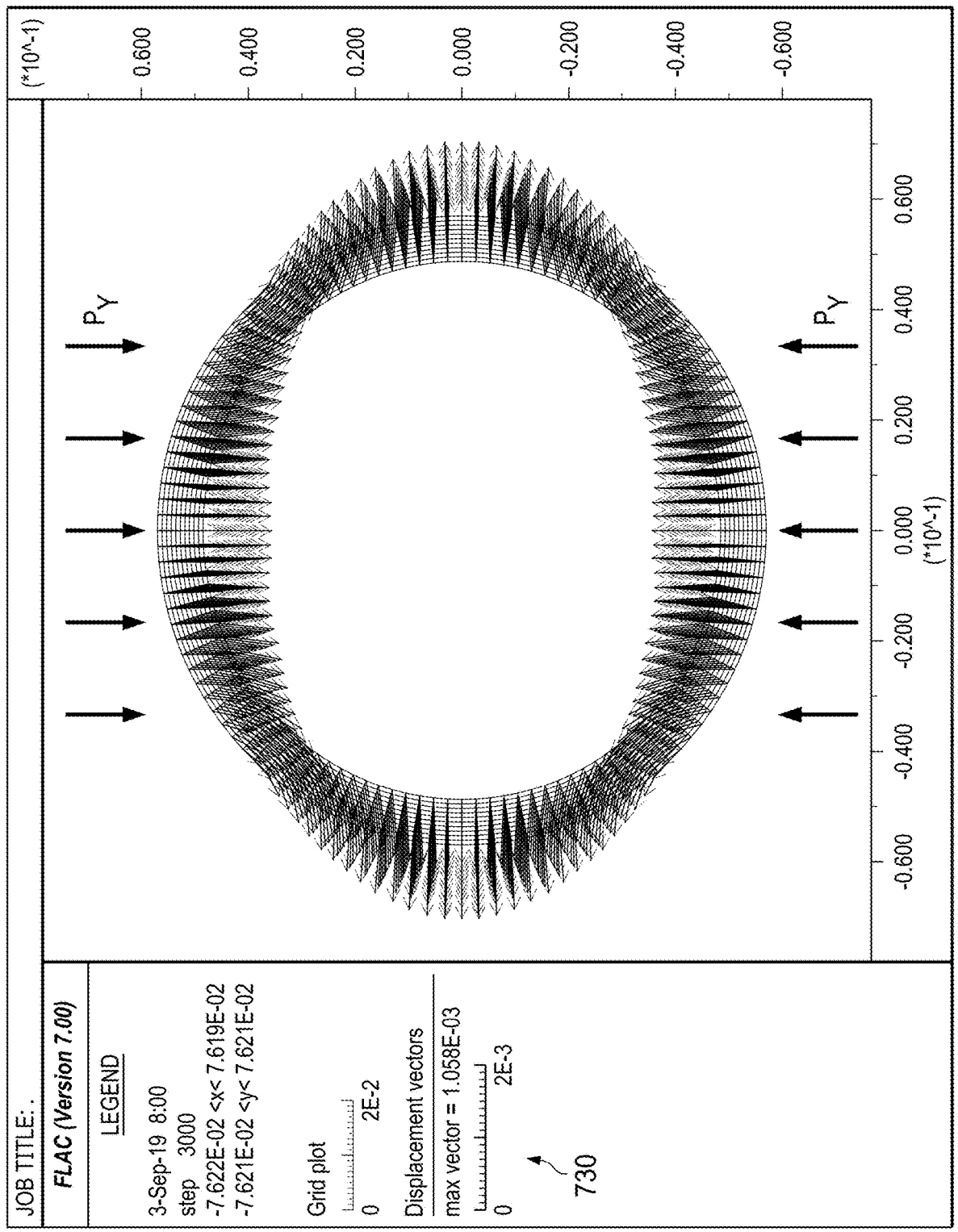

FIG. 7D is a displacement vector plot illustrating that the top and bottom of the liner displace about 2 mm radially inward when subject to the vertical pressure of $P_Y$=53 MPa. The magnitude of the displacement vector is represented by the plot legend 730. FIG. 7D also illustrates that the left and right sides of the liner displace about 2 mm radially outward when subject to the vertical pressure of $P_Y$=53 MPa.

FIG. 7A-7D demonstrate that the loading capacity of the liner is about $P_Y$=53 MPa when subjected to vertical compression. FIG. 6A-6C demonstrate that the loading capacity of the liner is about $P_Y$=230 MPa when subjected to a uniform external pressure (compression). Asymmetric pressure loading decreases the loading capacity of the liner drastically in this case. The vertical pressure loading predicts failure at a 23% lower pressure than in the uniform pressure case.

FIG. 8A-8F are the numerical simulation results for the case subjected to a non-uniform pressure loading $P_1$ over a portion of the outer circumference, $P_2$ over another portion of the outer circumference, and boundary condition 210 on another portion of the outer circumference (as seen in FIG. 2D). The boundary condition 210 constrains all displacement (horizontal and vertical) and rotational (in-plane rotation) degrees of freedom, but other boundary conditions can be used to simulate different environments. The modeling case where $P_1$ is applied to a quadrant, $P_2$ is applied to another quadrant of the model, and $P_1$=2$P_1$, simulates an environment where the liner is cemented to the well using a poor-quality cementing process. The simulations for this case assume these conditions.

Figure 8A:
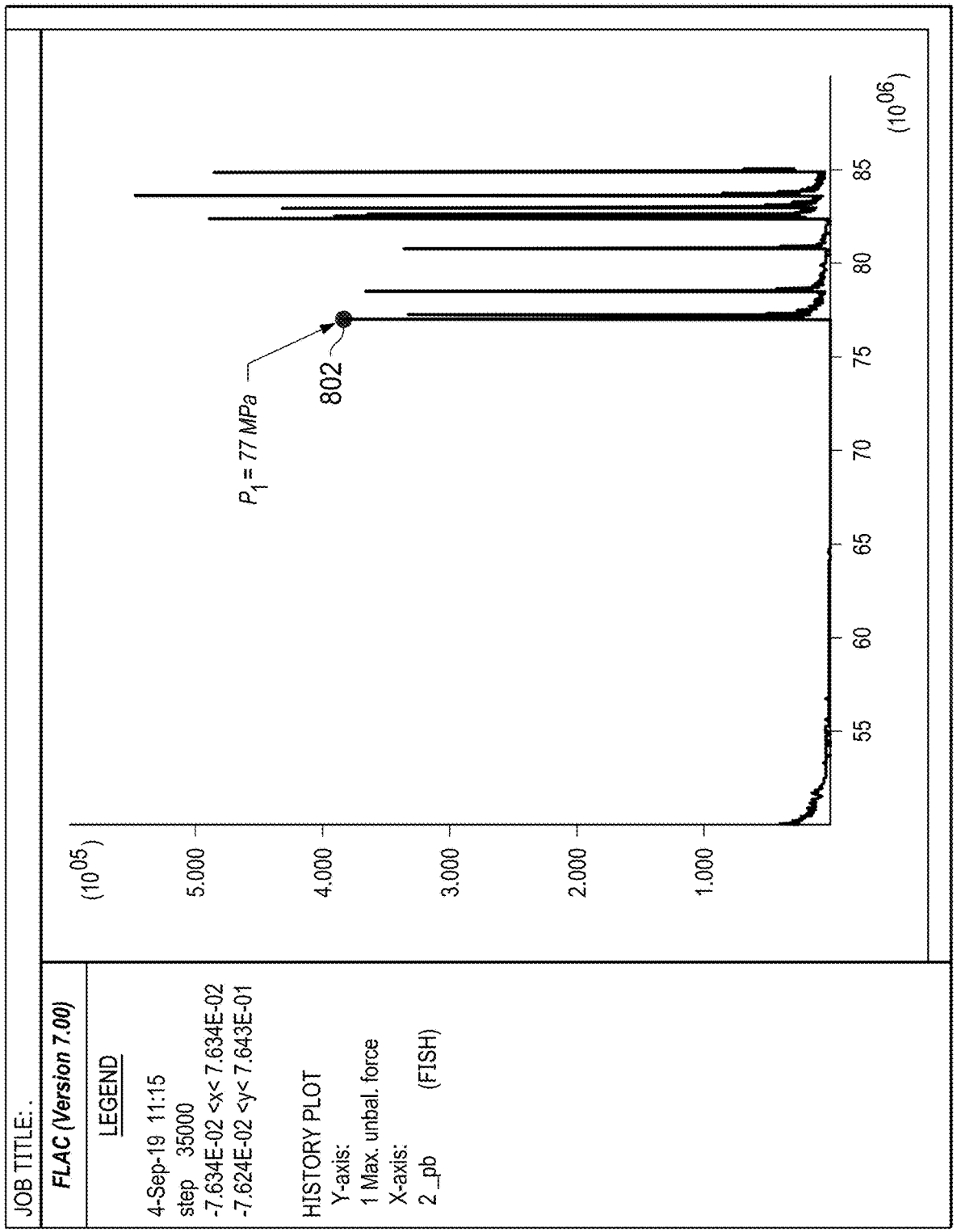
FIGS. 8A-8D are the numerical simulation results for the liner model subject to the conditions of FIG. 2D with an applied pressure ($P_1$) of 85 MPa.

FIG. 8A is a line plot of the maximum unbalanced force output in the simulation versus the applied pressure ($P_1$). The applied pressure is slowly increased until failure occurs. The maximum unbalanced force output is small (<$10^5$) at the beginning of the simulation. The maximum unbalanced force output abruptly increases when the applied pressure ($P_1$) reaches about 77 MPa. This is shown with marker 802. This abrupt increase represents a release of kinetic energy and is associated with the compression limit of the liner. This is also indicative of failure in the model.

Figure 8B:
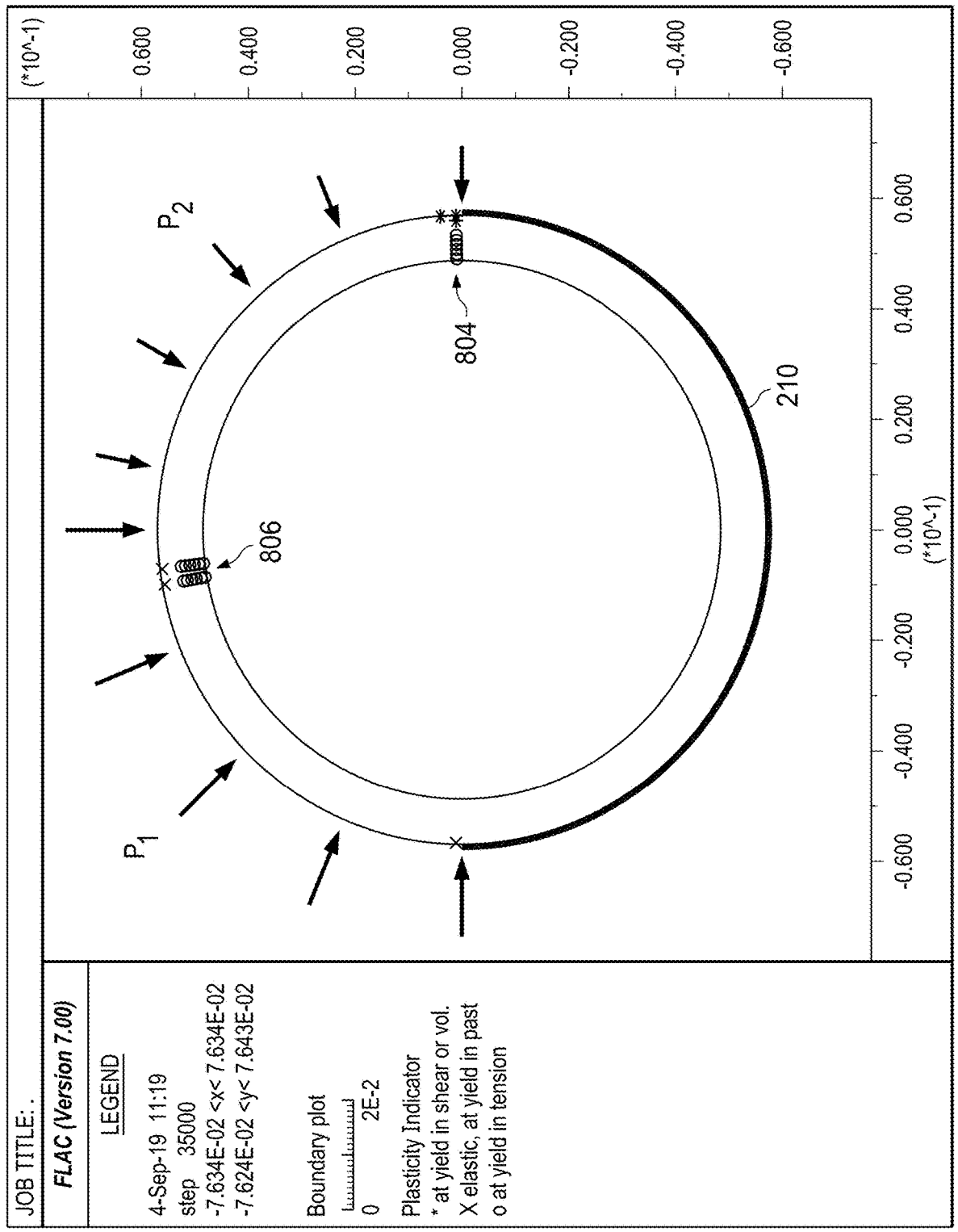

FIG. 8B is a plasticity indicator plot representing regions of the model that have yielded in tension (denoted by circle markers) when the vertical pressure of $P_1$=77 MPa is applied to the model. Despite being loaded in compression, the liner fails by the development of tensile cracks. Tensile cracks initiate on the inner surface of the model at two locations. The first location 804 is on the left side of the inside circumference of the model near the boundary condition. The second location 806 is near the top of the model on the inside circumference. Tensile yielding in the second location 806 occurs near the crown area where the applied pressure on the outer boundary is applied.

Figure 8C:
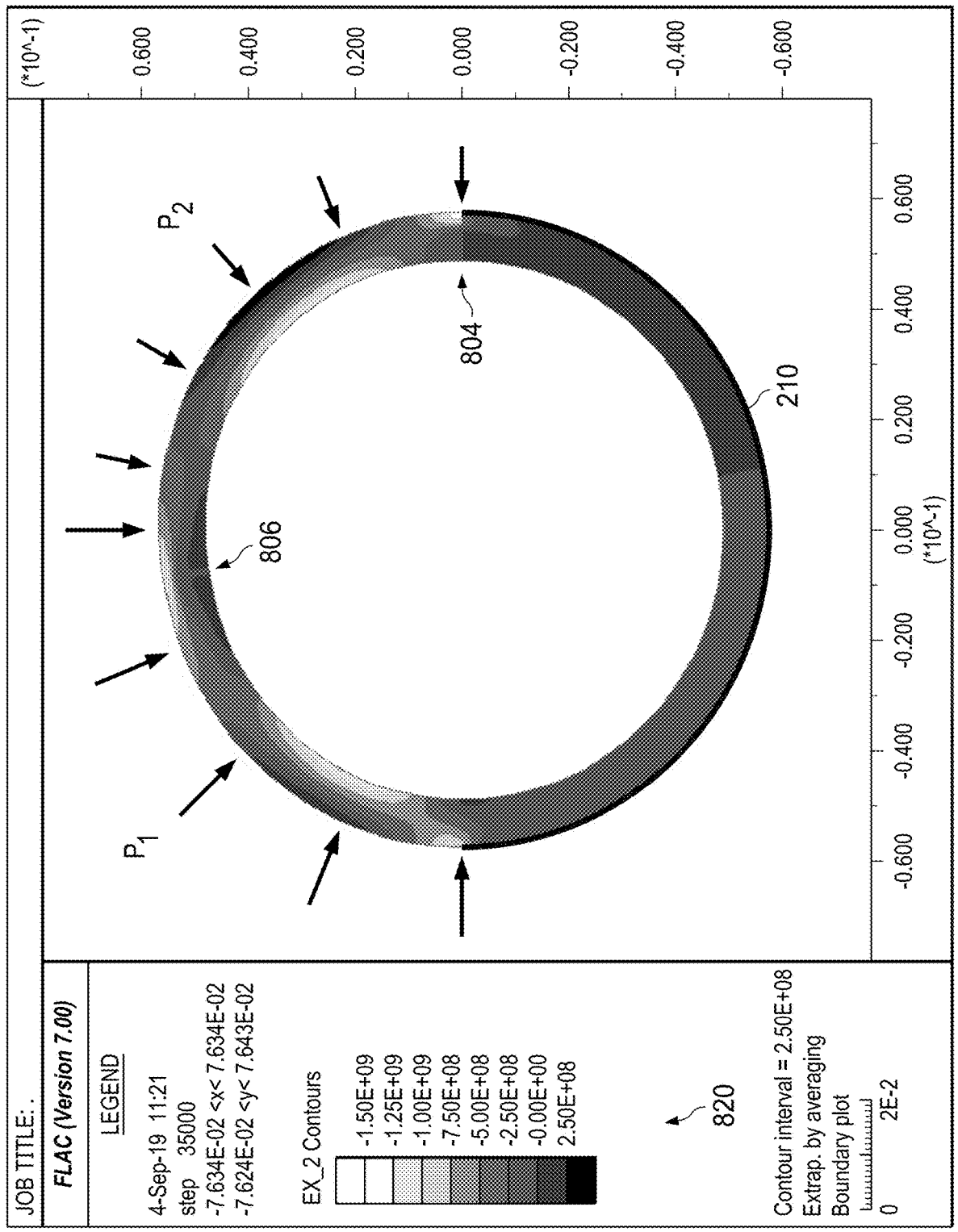

FIG. 8C is a contour of the tangential stress ($\sigma_{\theta\theta}$) distribution in the model when the vertical pressure of $P_1$=77 MPa is applied to the model. The magnitude of the stress is represented by the contour levels 820. A compressive tangential stress is indicated by a negative value and a tensile tangential stress is indicated by a positive value. FIG. 8C indicates that the tangential stress is in tension in both the first location 804 and the second location 806. This tensile stress result is in agreement with the plasticity indicators seen in FIG. 8B.

Figure 8D:
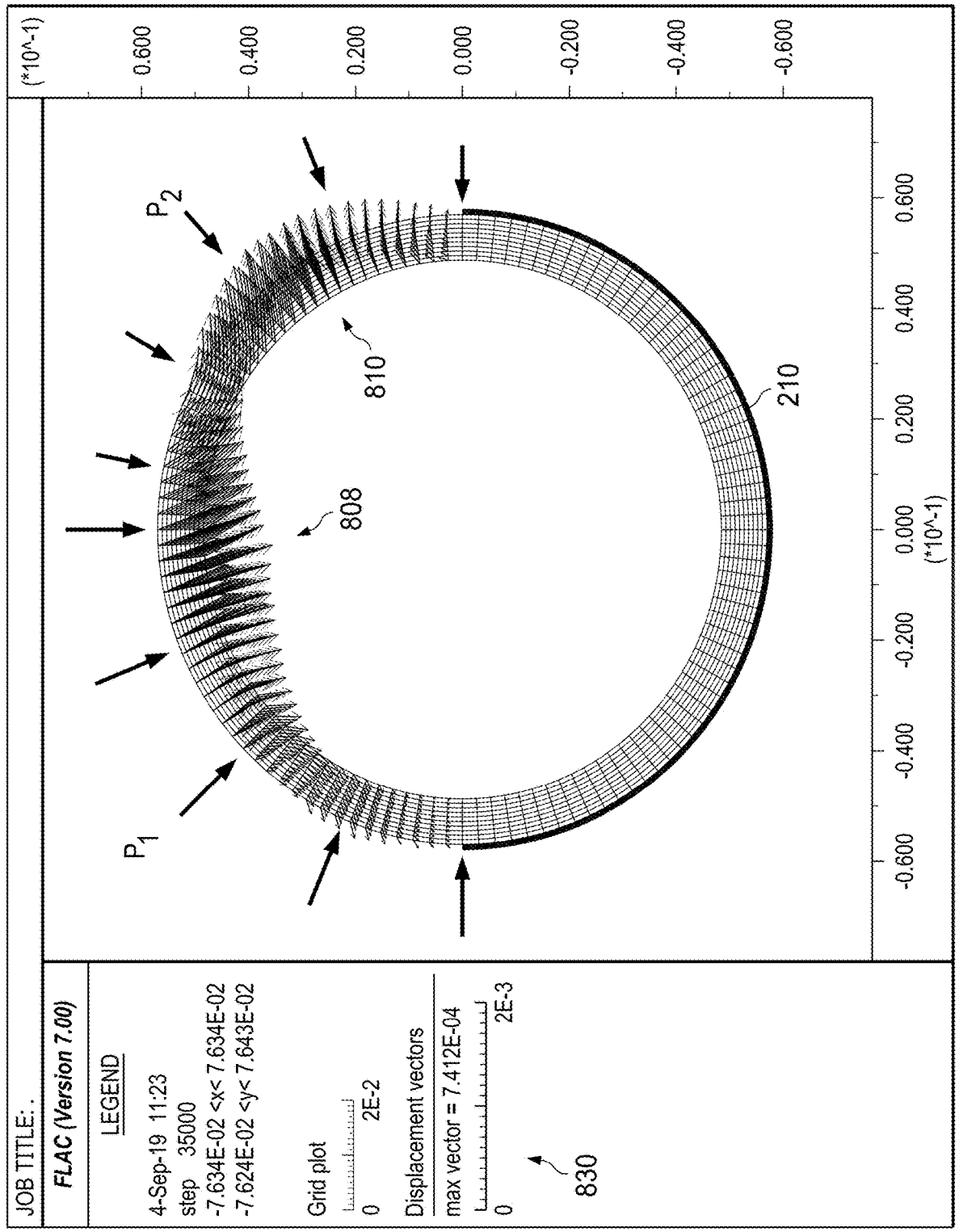

FIG. 8D is a displacement vector plot illustrating that the displacement pattern when the model is subject to the vertical pressure of $P_1$=77 MPa. The magnitude of the displacement vector is represented by the plot legend 830. FIG. 8D illustrates that the upper left portion 808 of the model deforms radially inward and the upper right portion 810 of the model deforms outward.

Figure 8E:
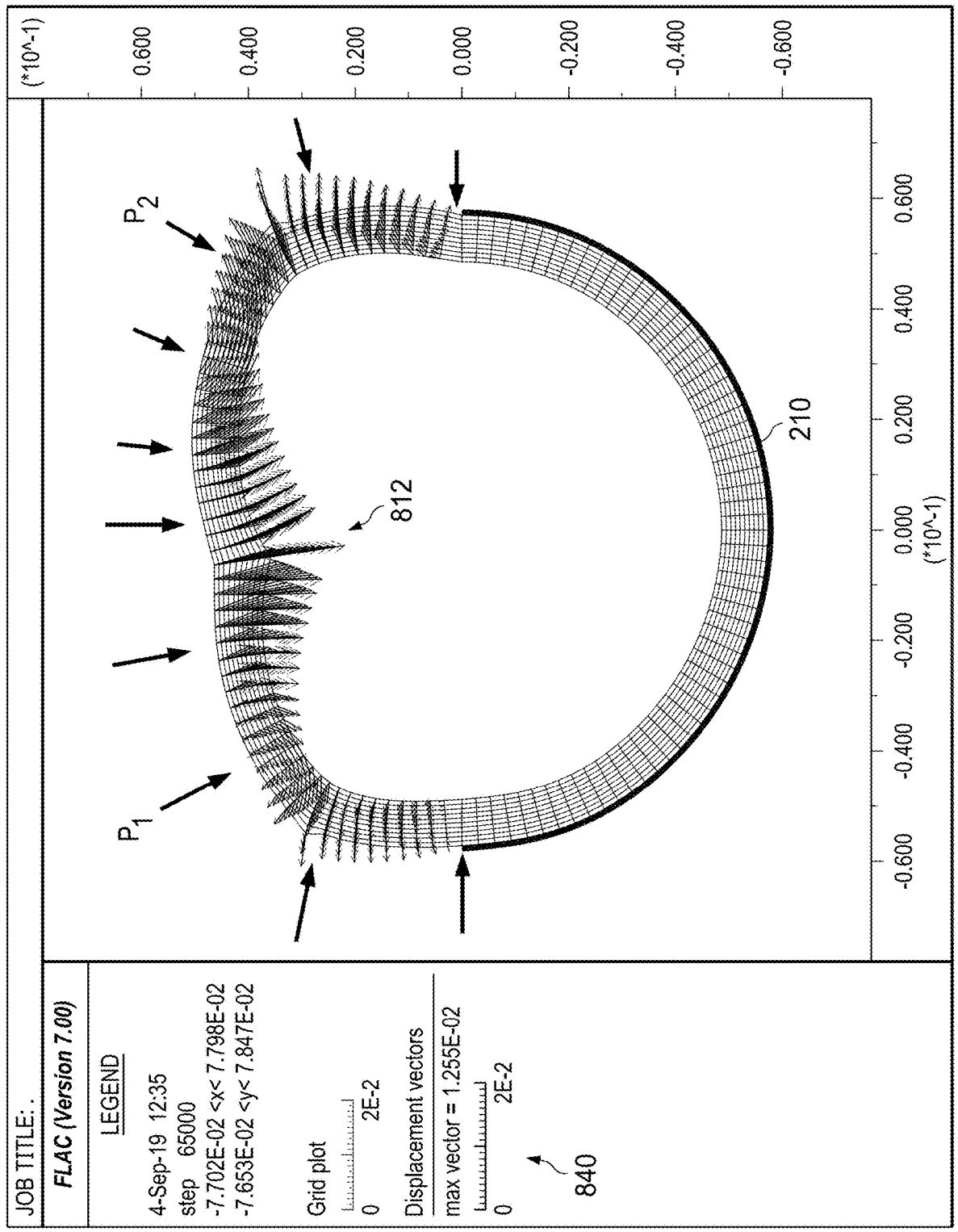
FIG. 8E-8F are the numerical simulation results for the liner model subject to the conditions of FIG. 2D with an applied pressure ($P_1$) of 115 MPa.

FIG. 8E is a displacement vector plot illustrating that the displacement pattern when the model is subject to a vertical pressure in excess of $P_1$=77 MPa. FIG. 8E represents the deformation state when $P_1$=115 MPa. The magnitude of the displacement vector is represented by the plot legend 840. The top region 812 of the liner displaces about 1.2 cm radially inward.

Figure 8F:
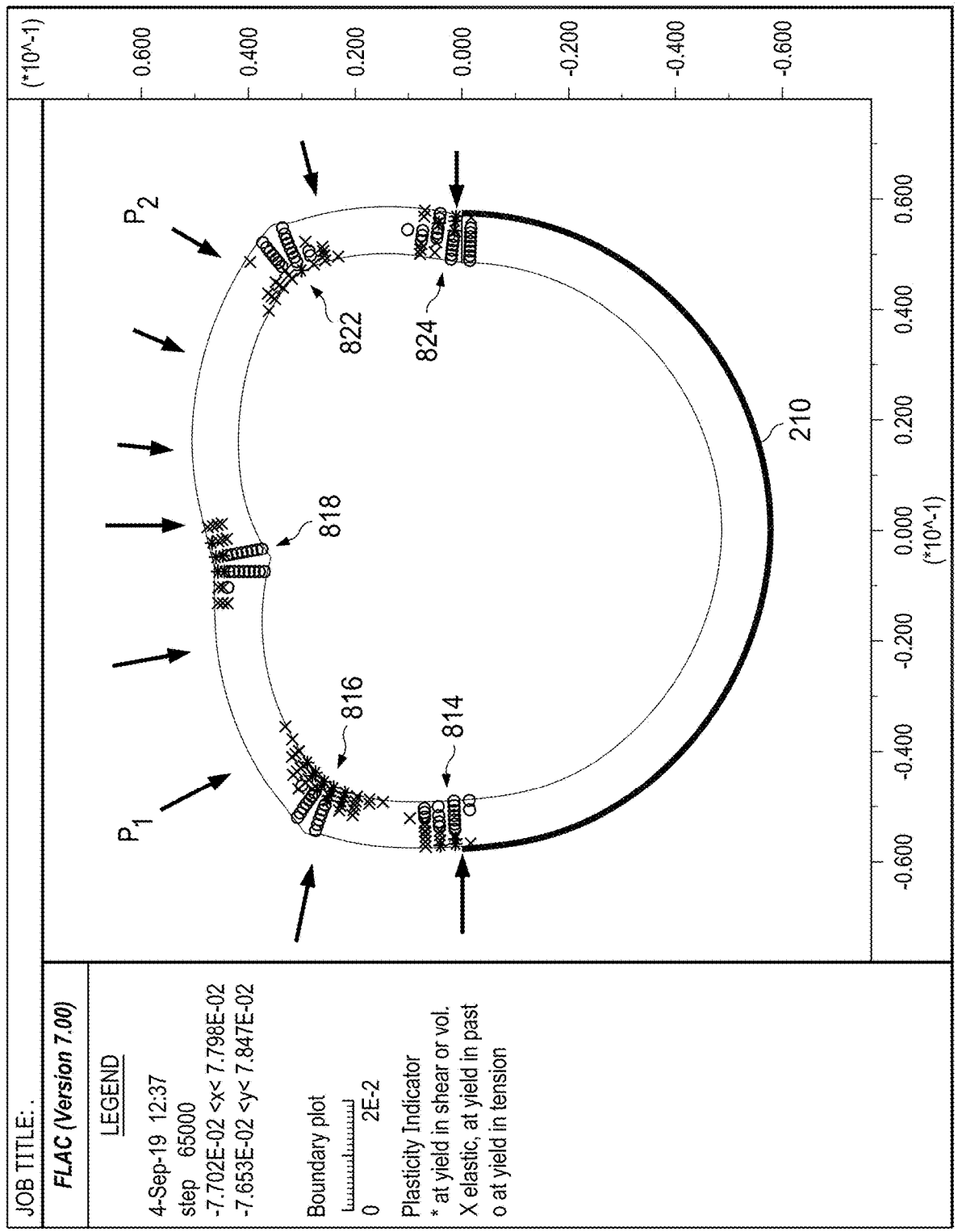

FIG. 8F is a plasticity indicator plot representing regions of the model that have yielded in tension (denoted by circle markers) when the vertical pressure of $P_1$=115 MPa is applied to the model. Tensile cracks and tensile yielding exist at five locations 814, 816, 818, 822, 824 along the circumference.

FIG. 8A-8F are simulation results indicating the performance of the liner in the well. The model has a calibrated constitutive model. This enables a one to design or select a liner for a given wellbore environment by simulating the environment of the well.

In some cases, the actual load distribution on the outside boundary of a liner in a downhole condition is computed from a full model including a liner, a cement and a formation. The actual properties of these materials are assigned to the full model and in-situ stresses and pore pressures are added to the model. In some cases, the procedure of completion, cementing and stimulation is simulated to closely represent the actual engineering procedure. Calibration of the full model and failure of the full model is determined using an approach analogous to the approach previously described for the liner alone.

While the numerical simulation uses a finite element implementation in FLAC, other numerical simulation methods can be used. In some cases, finite difference or finite volume methods are used.

While the constitutive model of the liner is a frictionless Mohr-Coulomb material model with limited cohesion and tensile strength, other constitutive models can be used.

While the constitutive model includes a tensile strength parameter and a compressive strength parameter that are both calibrated, some constitutive models have fewer than two parameters, and some constitutive models have greater than two parameters.

While the loading cases shown in FIG. 2A-2D are described, other loading cases can be used. In some cases, an internal pressure is applied to a portion of the inner circumference of the liner. In some cases, the internal pressure is split into to two or more regions of different pressure magnitudes. In some cases, the external pressure is split into more than two different pressure magnitudes to accommodate general load distributions within the downhole condition.

While the maximum unbalanced force is monitored to indicate the failure of the model, other indicators can be used. In some cases, the tensile plasticity and/or shear plasticity at each computational zone (element) can be monitored and evaluated at each calculation step/cycle.

While the model represents a plane strain model, other models can be used. In some cases, a full 3D solid model is used with six degrees of freedom.

Figure 9:
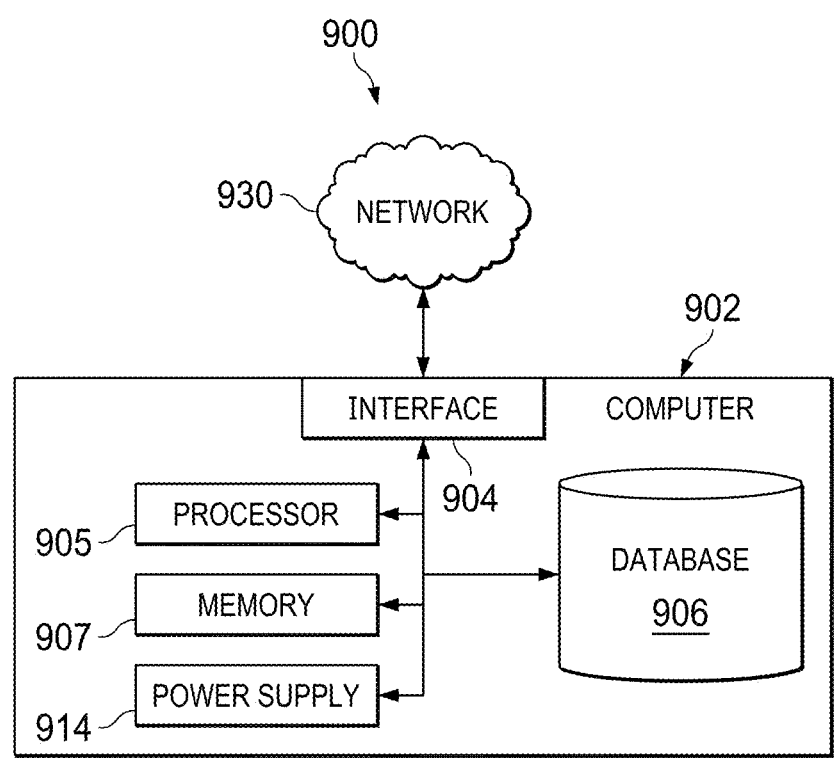
FIG. 9 is a block diagram of a computer system.

FIG. 9 is a block diagram of an example computer system 900 that can be used to provide computational functionalities associated with described algorithms, methods, functions, processes, flows, and procedures described in the present disclosure, according to some implementations of the present disclosure. In some embodiments, the computer system 900 performs the numerical simulation of the liner and displays the results on a display. In some embodiments, the computer system 900 receives user input and stores data representing the numerical simulation results.

The illustrated computer 902 is intended to encompass any computing device such as a server, a desktop computer, an embedded computer, a laptop/notebook computer, a wireless data port, a smart phone, a personal data assistant (PDA), a tablet computing device, or one or more processors within these devices, including physical instances, virtual instances, or both. The computer 902 can include input devices such as keypads, keyboards, and touch screens that can accept user information. Also, the computer 902 can include output devices that can convey information associated with the operation of the computer 902. The information can include digital data, visual data, audio information, or a combination of information. The information can be presented in a graphical user interface (UI) (or GUI). In some embodiments, the inputs and outputs include display ports (such as DVI-I+2x display ports), USB 3.0, GbE ports, isolated DI/O, SATA-III (6.0 Gb/s) ports, mPCIe slots, a combination of these, or other ports. In instances of an edge gateway, the computer 902 can include a Smart Embedded Management Agent (SEMA), such as a built-in ADLINK SEMA 2.2, and a video sync technology, such as Quick Sync Video technology supported by ADLINK MSDK+. In some examples, the computer 902 can include the MXE-5400 Series processor-based fanless embedded computer by ADLINK, though the computer 902 can take other forms or include other components.

The computer 902 can serve in a role as a client, a network component, a server, a database, a persistency, or components of a computer system for performing the subject matter described in the present disclosure. The illustrated computer 902 is communicably coupled with a network 930. In some embodiments, one or more components of the computer 902 can be configured to operate within different environments, including cloud-computing-based environments, local environments, global environments, and combinations of environments.

At a high level, the computer 902 is an electronic computing device operable to receive, transmit, process, store, and manage data and information associated with the described subject matter. According to some embodiments, the computer 902 can also include, or be communicably coupled with, an application server, an email server, a web server, a caching server, a streaming data server, or a combination of servers.

The computer 902 can receive requests over network 930 from a client application (for example, executing on another computer 902). The computer 902 can respond to the received requests by processing the received requests using software applications. Requests can also be sent to the computer 902 from internal users (for example, from a command console), external (or third) parties, automated applications, entities, individuals, systems, and computers.

Each of the components of the computer 902 can communicate using a system bus. In some implementations, any or all of the components of the computer 902, including hardware or software components, can interface with each other or the interface 1004 (or a combination of both), over the system bus. Interfaces can use an application programming interface (API), a service layer, or a combination of the API and service layer. The API can include specifications for routines, data structures, and object classes. The API can be either computer-language independent or dependent. The API can refer to a complete interface, a single function, or a set of APIs.

The service layer can provide software services to the computer 902 and other components (whether illustrated or not) that are communicably coupled to the computer 902. The functionality of the computer 902 can be accessible for all service consumers using this service layer. Software services, such as those provided by the service layer, can provide reusable, defined functionalities through a defined interface. For example, the interface can be software written in JAVA, C++, or a language providing data in extensible markup language (XML) format. While illustrated as an integrated component of the computer 902, in alternative implementations, the API or the service layer can be stand-alone components in relation to other components of the computer 902 and other components communicably coupled to the computer 902. Moreover, any or all parts of the API or the service layer can be implemented as child or sub-modules of another software module, enterprise application, or hardware module without departing from the scope of the present disclosure.

The computer 902 can include an interface 904. Although illustrated as a single interface 904 in FIG. 10, two or more interfaces 904 can be used according to particular needs, desires, or particular implementations of the computer 902 and the described functionality. The interface 904 can be used by the computer 902 for communicating with other systems that are connected to the network 930 (whether illustrated or not) in a distributed environment. Generally, the interface 904 can include, or be implemented using, logic encoded in software or hardware (or a combination of software and hardware) operable to communicate with the network 930. More specifically, the interface 904 can include software supporting one or more communication protocols associated with communications. As such, the network 930 or the interface's hardware can be operable to communicate physical signals within and outside of the illustrated computer 902.

The computer 902 includes a processor 905. Although illustrated as a single processor 1005 in FIG. 9, two or more processors 905 can be used according to particular needs, desires, or particular implementations of the computer 902 and the described functionality. Generally, the processor 905 can execute instructions and can manipulate data to perform the operations of the computer 902, including operations using algorithms, methods, functions, processes, flows, and procedures as described in the present disclosure.

The computer 902 can also include a database 906 that can hold data for the computer 902 and other components connected to the network 930 (whether illustrated or not). For example, database 906 can be an in-memory, conventional, or a database storing data consistent with the present disclosure. In some implementations, database 906 can be a combination of two or more different database types (for example, hybrid in-memory and conventional databases) according to particular needs, desires, or particular implementations of the computer 902 and the described functionality. Although illustrated as a single database 906 in FIG. 9, two or more databases (of the same, different, or combination of types) can be used according to particular needs, desires, or particular implementations of the computer 902 and the described functionality. While database 906 is illustrated as an internal component of the computer 902, in alternative implementations, database 906 can be external to the computer 902.

The computer 902 also includes a memory 907 that can hold data for the computer 902 or a combination of components connected to the network 930 (whether illustrated or not). Memory 907 can store any data consistent with the present disclosure. In some implementations, memory 907 can be a combination of two or more different types of memory (for example, a combination of semiconductor and magnetic storage) according to particular needs, desires, or particular implementations of the computer 902 and the described functionality. Although illustrated as a single memory 907 in FIG. 9, two or more memories 907 (of the same, different, or combination of types) can be used according to particular needs, desires, or particular implementations of the computer 902 and the described functionality. While memory 907 is illustrated as an internal component of the computer 902, in alternative implementations, memory 907 can be external to the computer 902.

An application can be an algorithmic software engine providing functionality according to particular needs, desires, or particular implementations of the computer 902 and the described functionality. For example, an application can serve as one or more components, modules, or applications. Multiple applications can be implemented on the computer 902. Each application can be internal or external to the computer 902.

The computer 902 can also include a power supply 914. The power supply 914 can include a rechargeable or non-rechargeable battery that can be configured to be either user- or non-user-replaceable. In some implementations, the power supply 914 can include power-conversion and management circuits, including recharging, standby, and power management functionalities. In some implementations, the power-supply 914 can include a power plug to allow the computer 902 to be plugged into a wall socket or a power source to, for example, power the computer 902 or recharge a rechargeable battery.

There can be any number of computers 902 associated with, or external to, a computer system including computer 902, with each computer 902 communicating over network 930. Further, the terms "client," "user," and other appropriate terminology can be used interchangeably, as appropriate, without departing from the scope of the present disclosure. Moreover, the present disclosure contemplates that many users can use one computer 902 and one user can use multiple computers 902.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. The example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application-specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example, Linux, Unix, Windows, Mac OS, Android, or iOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub-programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto-optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer-readable media (transitory or non-transitory, as appropriate) suitable for storing computer program instructions and data can include all forms of permanent/non-permanent and volatile/non-volatile memory, media, and memory devices. Computer-readable media can include, for example, semiconductor memory devices such as random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer-readable media can also include, for example, magnetic devices such as tape, cartridges, cassettes, and internal/removable disks. Computer-readable media can also include magneto-optical disks and optical memory devices and technologies including, for example, digital video disc (DVD), CD-ROM, DVD+/−R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated in, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that is used by the user. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

A number of embodiments of the systems and methods have been described. Nevertheless, it will be understood that various modifications may be made without departing from the spirit and scope of this disclosure. Accordingly, other embodiments are within the scope of the following claims.

What is claimed is:

1. A method for predicting a structural response and failure of a liner for a well, the method comprising:
receiving geometric properties of the liner, the geometric properties comprising an inner diameter of the liner and an outer diameter of the liner;
receiving structural properties of the liner, the structural properties comprising an experimental burst failure pressure and an experimental collapse failure pressure, the experimental burst failure pressure defining a failure of the liner when the liner is subject to a uniform internal pressure applied on the inner diameter of the liner, the experimental collapse failure pressure defining a failure of the liner when the liner is subject to a uniform external pressure applied on the outer diameter of the liner;
receiving material properties of the liner, the material properties including an elastic modulus of the liner;
developing a numerical model of the liner, the numerical model representing the liner and comprising the received geometric properties, the received structural properties, and the received material properties, the numerical model further comprising a constitutive model;
calibrating one or more parameters of the constitutive model representing the material of the liner, the calibrating comprising:
determining a numerical burst pressure failure by simulating a burst pressure response of the numerical model when the liner is subject to a uniform internal pressure applied on the inner diameter of the liner;
determining a numerical collapse failure pressure by simulating a collapse pressure of the numerical model when the liner is subject to a uniform external pressure applied on the outer diameter of the liner; and
updating at least one of the one or more parameters of the constitutive model based on a difference between the numerical burst pressure failure and the experimental burst pressure failure and a difference between the numerical collapse pressure failure and the experimental collapse pressure failure; and
simulating the structural response and failure of the numerical model subjected to an expected non-uniform pressure loading of the well, wherein the numerical model is used to predict the structural response and failure of the liner when installed in the well.

2. The method of claim 1, further comprising:
receiving an initial estimate of the one or more parameters of the constitutive model.

3. The method of claim 1, wherein calibrating the one or more parameters of the constitutive model further comprises:
iterating, using the updated at least one of the one or more parameters of the constitutive model, a simulation of the numerical model to determine a refined numerical burst pressure failure of the numerical model and a refined numerical collapse pressure failure of the numerical model.

4. The method of claim 1, wherein calibrating the one or more parameters of the constitutive model further comprises:
accepting at least one of the one or more parameters of the constitutive model if the difference between the numerical burst pressure failure and the experimental burst pressure failure is below a first threshold.

5. The method of claim 4, wherein the first threshold is 5%.

6. The method of claim 1, wherein calibrating the one or more parameters of the constitutive model further comprises:
accepting at least one of the one or more parameters of the constitutive model if the difference between the numerical collapse pressure failure and the experimental collapse pressure failure is below a second threshold.

7. The method of claim 6, wherein the second threshold is 5%.

8. The method of claim 1, further comprising:
monitoring a kinetic energy of the numerical model to determine an onset of failure of the numerical model.

9. The method of claim 1, further comprising:
detecting a kinetic energy of the numerical model above an energy threshold indicative of an onset of failure of the numerical model.

10. The method of claim 1, wherein the one or more parameters of a constitutive model comprises a compressive strength of a constitutive model and a tensile strength of the constitutive model.

11. The method of claim 1, wherein the constitutive model is a frictionless Mohr-Coulomb material constitutive model.

12. The method of claim 1, wherein the non-uniform pressure loading of the well is at least in part caused by one or more formations.

13. The method of claim 1, wherein the non-uniform pressure loading of the well is at least in part caused by cement between the liner and one or more formations.

14. The method of claim 1, wherein the non-uniform pressure loading of the well is at least in part caused by a flow of oil in the liner.

15. The method of claim 1, wherein the non-uniform pressure loading of the well is at least in part caused by a completion condition of the liner.

16. The method of claim 1, wherein determining the numerical burst pressure failure is de-coupled from determining the numerical collapse failure pressure.

17. A method for predicting a structural response and failure of a liner of a well, the method comprising:
calibrating one or more parameters of a constitutive model representing a material of the liner, the one or more parameters being part of a constitutive model, the one or more parameters comprising a compressive strength of the constitutive model and a tensile strength of the constitutive model, the calibrating comprising:

determining a numerical burst pressure failure by simulating a burst pressure response of a numerical model of the liner when the liner is subject to a uniform internal pressure applied on an inner diameter of the liner, wherein the numerical burst pressure failure is determined by detecting a kinetic energy of the numerical model above a first threshold indicative of an onset of failure of the numerical model;

determining a numerical collapse failure pressure by simulating a collapse pressure of the numerical model when the liner is subject to a uniform external pressure applied on an outer diameter of the liner, wherein the numerical collapse pressure failure is determined by detecting a kinetic energy of the numerical model above a second threshold indicative of an onset of failure of the numerical model; and updating at least one of the one or more parameters of the constitutive model based on a difference between the numerical burst pressure failure and an experimental burst pressure failure and a difference between the numerical collapse pressure failure and an experimental collapse pressure failure; and simulating the structural response and failure of the numerical model subjected to an expected non-uniform pressure loading of the well, wherein the numerical model is used to predict the structural response and failure of the liner when installed in the well.

18. The method of claim 17, wherein the constitutive model is a frictionless Mohr-Coulomb material constitutive model.

19. The method of claim 17, wherein calibrating the one or more parameters of the constitutive model further comprises:

iterating, using the updated at least one of the one or more parameters of the constitutive model, a simulation of the numerical model to determine a refined numerical burst pressure failure of the numerical model and a refined numerical collapse pressure failure of the numerical model.

20. The method of claim 17, wherein calibrating the one or more parameters of the constitutive model further comprises:

accepting at least one of the one or more parameters of the constitutive model if (i) the difference between the numerical burst pressure failure and the experimental burst pressure failure is below a third threshold and (ii) the difference between the numerical collapse pressure failure and the experimental collapse pressure failure is below a fourth threshold.

* * * * *